US010782743B2

(12) United States Patent
Kitamura et al.

(10) Patent No.: US 10,782,743 B2
(45) Date of Patent: Sep. 22, 2020

(54) KEYBOARD DEVICE

(71) Applicant: LENOVO (SINGAPORE) PTE. LTD., Singapore (SG)

(72) Inventors: Masahiro Kitamura, Kanagawa (JP); Mitsuo Horiuchi, Kanagawa (JP); Satoshi Douzono, Kanagawa (JP)

(73) Assignee: LENOVO (SINGAPORE) PTE LTD, Singapore (SG)

(*) Notice: Subject to any disclaimer, the term of this patent is extended or adjusted under 35 U.S.C. 154(b) by 90 days.

(21) Appl. No.: 16/013,416

(22) Filed: Jun. 20, 2018

(65) Prior Publication Data

US 2018/0364765 A1 Dec. 20, 2018

(30) Foreign Application Priority Data

Jun. 20, 2017 (JP) ................................ 2017-120248

(51) Int. Cl.
*G06F 1/16* (2006.01)
*G06F 3/02* (2006.01)

(52) U.S. Cl.
CPC .......... *G06F 1/1662* (2013.01); *G06F 3/0202* (2013.01); *G06F 1/1616* (2013.01)

(58) Field of Classification Search
None
See application file for complete search history.

(56) References Cited

U.S. PATENT DOCUMENTS 4,509,873 A * 4/1985 Ryan .......................... B41J 5/10 341/22
5,454,652 A * 10/1995 Huellemeier ............ B41J 5/105 341/20
5,612,691 A 3/1997 Murmann et al.
5,613,786 A * 3/1997 Howell ................. G06F 1/1616 400/472
5,733,056 A * 3/1998 Meagher ............... G06F 3/0221 400/472
5,800,085 A * 9/1998 Lee ....................... G06F 1/1616 400/489

(Continued)

FOREIGN PATENT DOCUMENTS

CN 202307646 U 7/2012
JP 02-005831 1/1990

(Continued)

*Primary Examiner* — Courtney L Smith
*Assistant Examiner* — Rashen E Morrison
(74) *Attorney, Agent, or Firm* — Antony P. Ng; Russell Ng PLLC

(57) ABSTRACT

A keyboard device is provided. The keyboard device includes a baseplate, a set of keytops, a frame, and a set of plate members. The set of keytops is supported in a vertically movable manner on an upper surface side of the baseplate. The frame mounted on the upper surface side of the baseplate, and the frame includes a set of openings in which the keytops are inserted in a vertically movable manner. The set of plate members arranged along a longer direction within the baseplate, and bridges that connect adjacent plate members. The adjacent plate members are arranged with a gap provided between end surfaces thereof that oppose each other and are relatively movable through at least the bridges in a direction in which the plate members are arranged.

16 Claims, 16 Drawing Sheets

12
REAR
FRONT
LEFT
RIGHT
20 28a 20 18 16 22 24 14 10 28 22 24 28b 28c 26

28b 30 28a 28c 45 44 28a 28b 28c 28 45 44 26
REAR
FRONT
LEFT
RIGHT
40 45 G1 44 28b 28a 28c 41 G2 44 28a 28c 42 28b

(56) References Cited

U.S. PATENT DOCUMENTS

| | | | | |
|---|---|---|---|---|
| 6,174,097 | B1 * | 1/2001 | Daniel | G06F 3/0221<br>400/472 |
| 6,575,647 | B1 * | 6/2003 | Daniel | G06F 3/0221<br>400/472 |
| 6,798,649 | B1 * | 9/2004 | Olodort | G06F 1/1618<br>235/61 R |
| 7,388,743 | B2 * | 6/2008 | Lin | G06F 1/1616<br>206/320 |
| 8,902,167 | B2 * | 12/2014 | Linegar | G06F 1/1664<br>345/168 |
| 9,098,250 | B2 * | 8/2015 | Doi | G06F 1/1616 |
| 9,733,722 | B2 * | 8/2017 | Norwalk | G06F 3/0202 |
| 2007/0146976 | A1 * | 6/2007 | Lin | G06F 1/1616<br>361/679.08 |
| 2013/0264182 | A1 * | 10/2013 | Shen | H01H 13/705<br>200/5 A |

FOREIGN PATENT DOCUMENTS

| | | | |
|---|---|---|---|
| JP | 3067939 | | 1/2000 |
| JP | 3087054 | | 4/2002 |
| JP | 2009-075980 | A | 4/2009 |
| JP | 2009-075982 | A | 4/2009 |
| JP | 2015-141868 | A | 8/2015 |
| TW | 200745915 | A | 12/2007 |
| TW | 420813 | | 1/2012 |
| WO | 2012119516 | A1 | 9/2012 |
| WO | 2015096045 | A1 | 7/2015 |

* cited by examiner

12

KEYBOARD DEVICE

PRIORITY CLAIM

The present application claims benefit of priority under 35 U.S.C. §§ 120, 365 to the previously filed Japanese Patent Application No. JP2017-120248 with a priority date of Jun. 20, 2017, which is incorporated by reference herein.

TECHNICAL FIELD

The present invention relates to keyboard devices in general, and in particular to a keyboard device for an electronic apparatus.

BACKGROUND

A keyboard device used with an electronic apparatus, such as a personal computer (PC), has an isolation structure in which keytops are isolated by a frame. The isolation type keyboard device makes it possible to configure its operation surface to be flat, contributing to a higher quality of appearance. In addition, the keyboard device enables the clearance between keytops, i.e., the clearance between keytops and the frame, to be smaller than that in a typical non-isolation type keyboard device, so that the possibility of dust and/or dirt falling in through the gaps can be minimized.

In an isolation type keyboard device, keytops and a frame are normally mounted on the upper surface side of a baseplate. Hence, the size of the clearance between each keytop and the frame is required to be set, taking into account the dimensional tolerances of the baseplate and the frame or the mounting tolerance of the keytops. In other words, it is required to secure a certain size of a clearance between each keytop and the frame in order for the keytops to smoothly travel vertically in openings provided in the frame.

However, the clearance between each keytop and the frame is desirably to be made as, small as possible in order to improve the appearance quality of the keyboard device and to prevent dust and/or dirt from falling through the clearances.

Consequently, it would be preferable to provide an improved keyboard device having a reduced clearance between each keytop and a frame while still maintaining smooth keytop movements.

SUMMARY

In accordance with an embodiment of the present disclosure, a keyboard device includes a baseplate, a set of keytops, a frame, and a set of plate members. The set of keytops is supported in a vertically movable manner on an upper surface side of the baseplate. The frame mounted on the upper surface side of the baseplate, and the frame includes a set of openings in which the keytops are inserted in a vertically movable manner. The set of plate members arranged along a longer direction within the baseplate, and bridges that connect adjacent plate members. The adjacent plate members are arranged with a gap provided between end surfaces thereof that oppose each other and are relatively movable through at least the bridges in a direction in which the plate members are arranged.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
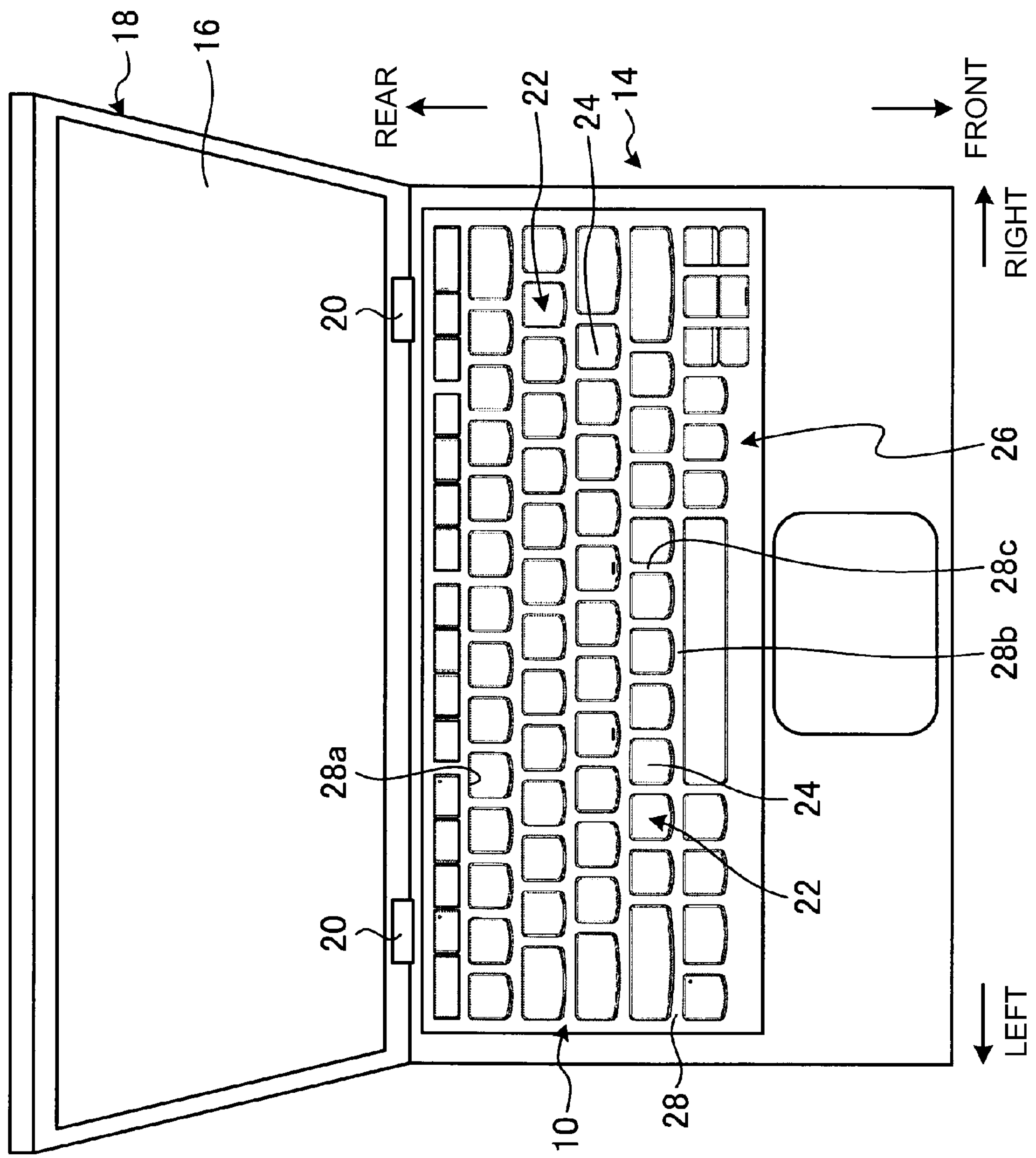
FIG. 1 is a diagram of an electronic apparatus provided with a keyboard device.

FIG. 1 is a diagram of an electronic apparatus 12 observed from above, the electronic apparatus 12 being provided with a keyboard device 10, according to one embodiment. The electronic apparatus 12 is a laptop PC in which a main body chassis 14 provided with the keyboard device 10 and a display chassis 18 provided with a display 16 are connected by hinges 20 in an openable and closable manner. The disclosed contents herein may be used for an electronic apparatus other than a laptop PC and may be used for, e.g., an external keyboard device used with a desktop PC.

In the following description, the keyboard device 10 is used basically by being installed to the electronic apparatus 12, as illustrated in FIG. 1. The front side in the drawing will be referred to as the front, the back side will be referred to as the rear, the direction of thickness will be referred to as top and bottom, and the direction of width will be referred to as left and right.

The main body chassis 14 houses therein various types of electronic components, such as a substrate, an arithmetic processing unit, a hard disk unit, and memories, which are not illustrated. The keyboard device 10 is provided such that the keyboard device 10 is exposed on the upper surface of the main body chassis 14. The display chassis 18 has, on the front surface thereof, the display 16 composed of a liquid crystal display or the like. The display chassis 18 is connected to the rear end of the main body chassis 14 through the hinges 20 in the openable and closable manner.

The keyboard device 10 includes a set of keys 22. The keyboard device 10 is an isolation type keyboard device, in which the space around each of keytops 24, which provides the operation surface of each of the keys 22, is separated by a frame (isolation frame) 26. Each of the keytops 24 is partitioned from another keytop 24 adjacent thereto by a frame section 28 of the frame 26, so that each of the keytops 24 is independently placed.

Figure 2:
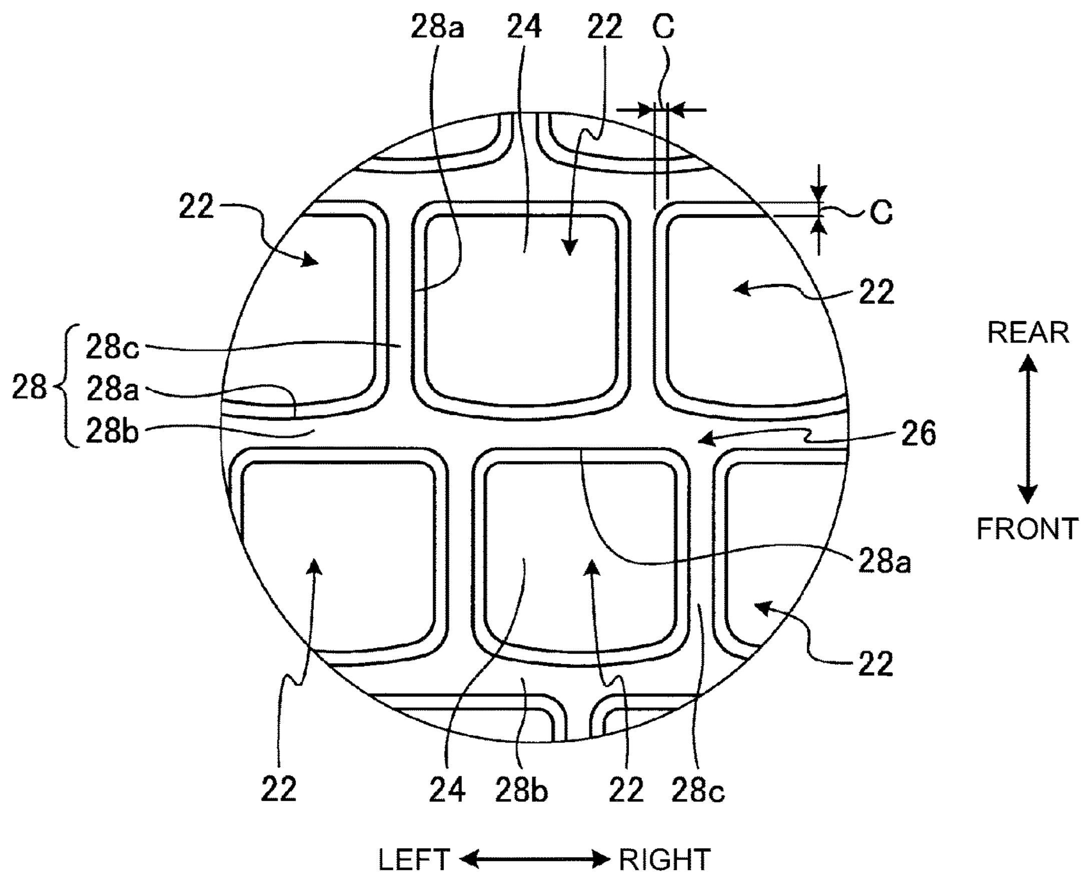
FIG. 2 is an enlarged top view of a part of the keyboard device.
Figure 3:
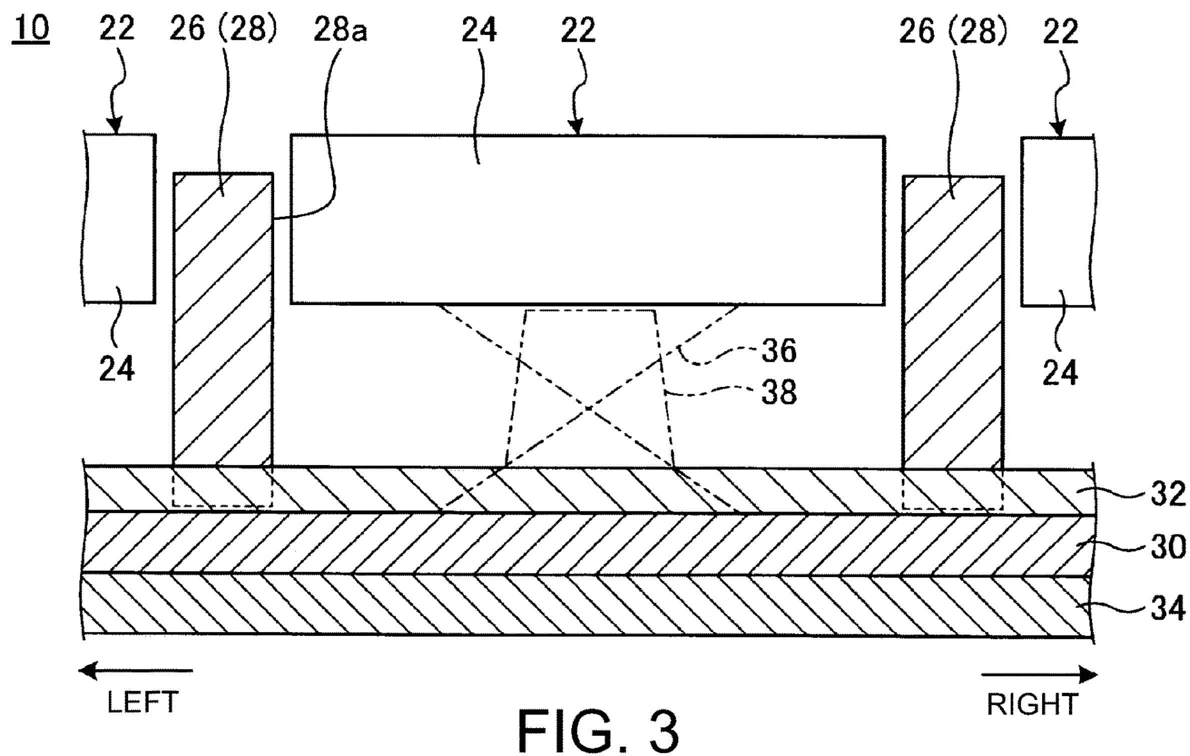
FIG. 3 is a side sectional view of the keyboard device.

FIG. 2 is an enlarged top view of a part of the keyboard device 10. FIG. 3 is aside sectional view of the keyboard device 10.

As illustrated in FIGS. 1-3, the frame 26 is composed of a plate-like member that is formed of a resin, a metal or the like and which is provided with the frame section 28. The frame section 28 has a plurality of openings 28*a* in which the keytops 24 are inserted. The frame 26 is provided such that the frame 26 is approximately flush with or slightly lower than the upper surface of the main body chassis 14 and the operation surfaces of the keytops 24 (refer to FIG. 3). The frame 26 in the present embodiment is configured to be separate from the upper surface cover of the main body chassis 14 of the electronic apparatus 12 (refer to FIG. 1). Alternatively, however, the frame 26 may be made integral with the upper surface cover of the main body chassis 14.

The frame section 28 has horizontal frame portions 28*b* and vertical frame portions 28*c*, which define the openings 28*a*. As illustrated in FIG. 1, the keys 22 are, in principle, arranged in a line in the lateral direction (horizontal direction) except at the right front end position, and are laterally staggered in the longitudinal direction (vertical direction) except at the left and right end positions. Thus, the horizontal frame portions 28*b* extend in the lateral direction except for the right front end position, while the vertical frame portions 28*c* are arranged in a zigzag pattern that bends in the longitudinal direction and the lateral direction except at the left and right end positions.

As illustrated in FIG. 3, the keyboard device 10 includes the plurality of keys 22, a baseplate 30, a membrane sheet 32, and a backlight sheet 34.

Each of the keys 22 has the keytop 24, a guiding mechanism 36, and a rubber dome 38. The guiding mechanism 36 is adapted to support the keytop 24 on the upper surface side of the baseplate 30 such that the keytop 24 is vertically movable. The guiding mechanism 36 is a pantograph mechanism that connects the bottom surface of the keytop 24 and the upper surface of the baseplate 30. The rubber dome 38 is a dome-shaped member formed of an elastic material, such as a silicone rubber, which has flexibility, and is provided between the membrane sheet 32 and the keytop 24. The rubber dome 38 is an elastic member that presses the membrane sheet 32 when the keytop 24 is depressed, and resets the keytop 24 to the original position thereof when the operation for depressing the keytop 24 is cleared.

The baseplate 30 is a plate on which the keys 22 and the frame 26 are mounted. The baseplate 30 is formed by cutting and raising or punching a metal plate-shaped member, such as a stainless steel plate or an aluminum plate, which has a thickness of, for example, 0.3 mm. The baseplate 30 in the present embodiment has a split structure, in which the plate is divided into three segments in the longer direction (the lateral direction). This will be described in more detail later.

The membrane sheet 32 is deposited on the upper surface of the baseplate 30. The membrane sheet 32 is, for example, a three-layer switch sheet, in which a contact is closed when pressed. The membrane sheet 32 is adapted to close the contact by bringing a movable contact into intimate contact with a fixed contact when, for example, a point at which the fixed contact and the movable contact overlap is pressed. The membrane sheet 32 has through holes at places, and the guiding mechanism 36 lands on the upper surface of the baseplate 30 through the through holes. The membrane sheet 32 may alternatively be deposited on the lower surface side of the baseplate 30.

The backlight sheet 34 is deposited on the lower surface side of the baseplate 30. The backlight sheet 34 mainly includes a resinous light guide plate, such as PET, polycarbonate or acrylic, which has translucency, and has a light source, such as an LED element, at a lateral center or a lateral end. The backlight sheet 34 guides the light emitted from the light source in the lateral direction such that the light is reflected off of a light reflection surface thereby to illuminate the keytops 24 from the back surface.

Figure 4:
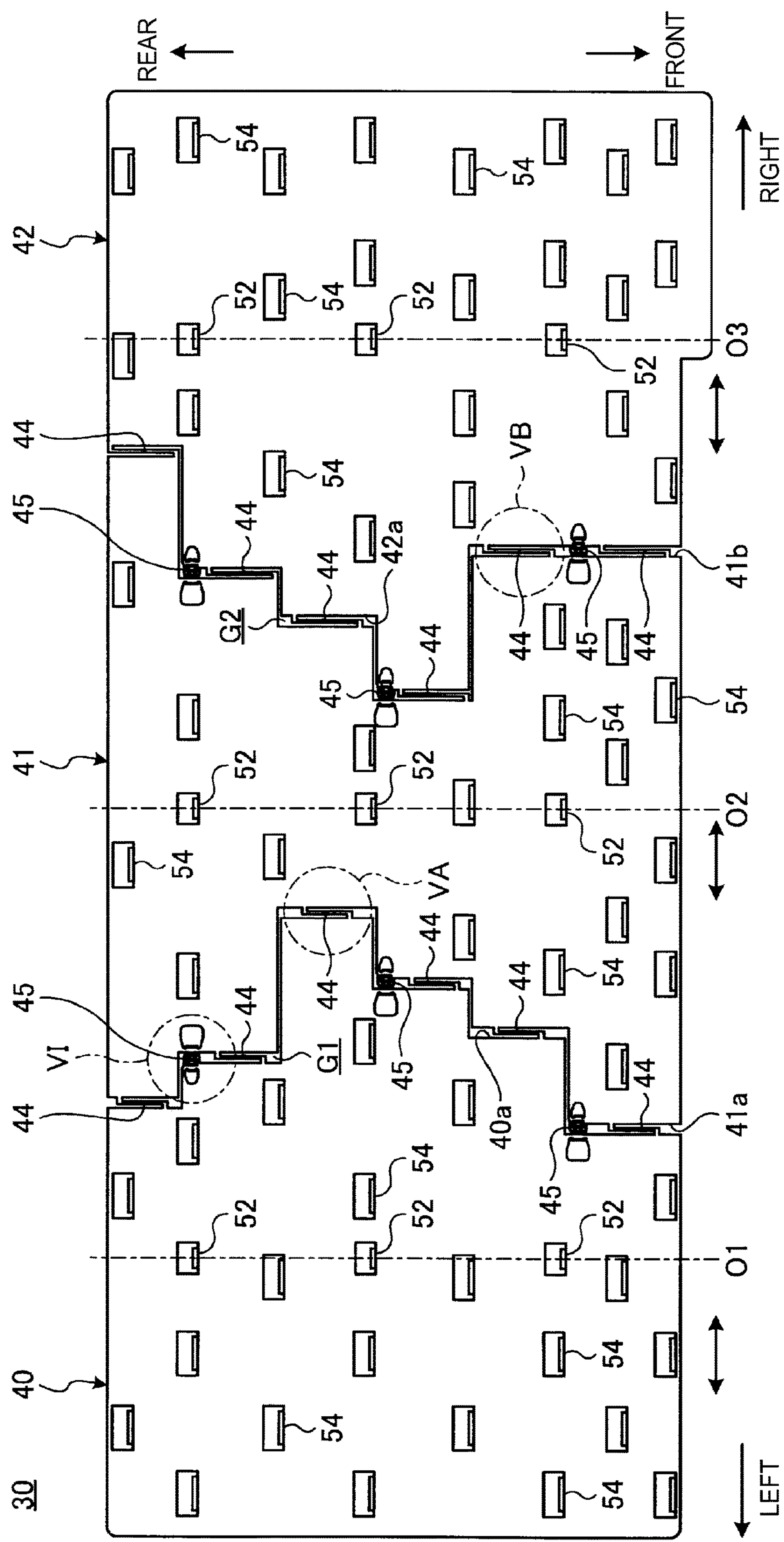
FIG. 4 is a top view of a baseplate.
Figure 5A:
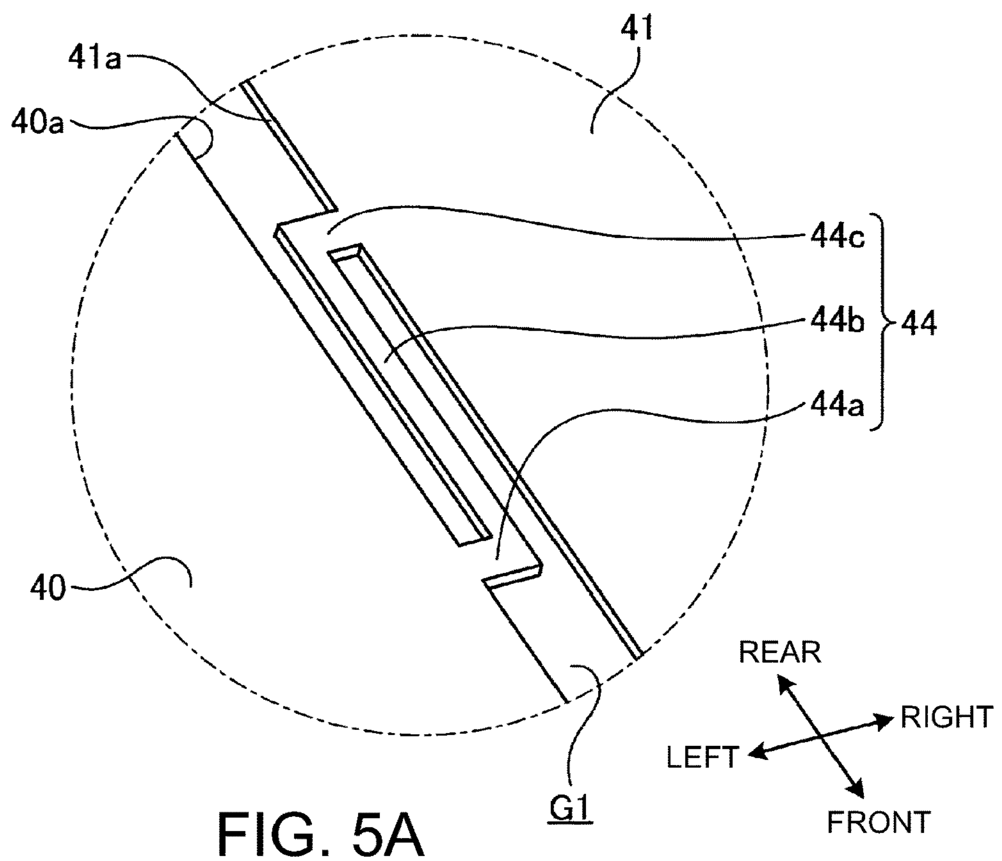
FIG. 5A is an enlarged perspective view of a part enclosed by a circle VA in FIG. 4.
Figure 5B:
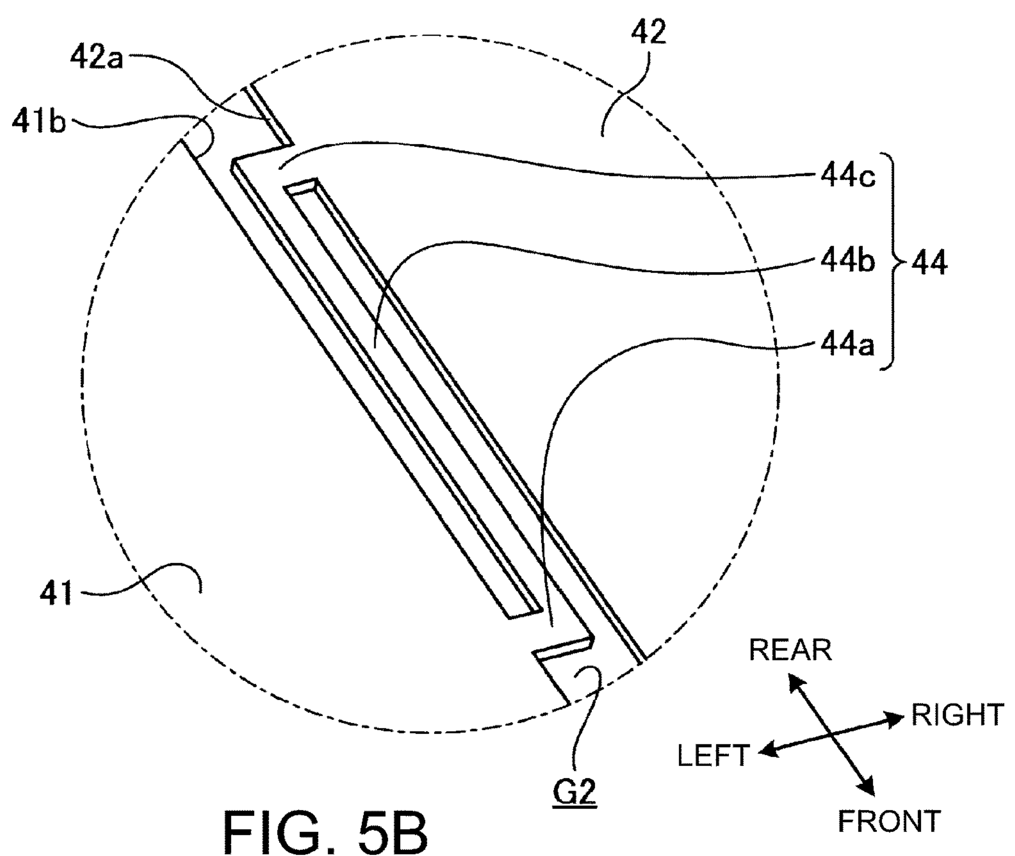
FIG. 5B is an enlarged perspective view of a part enclosed by a circle VB in FIG. 4.
Figure 6A:
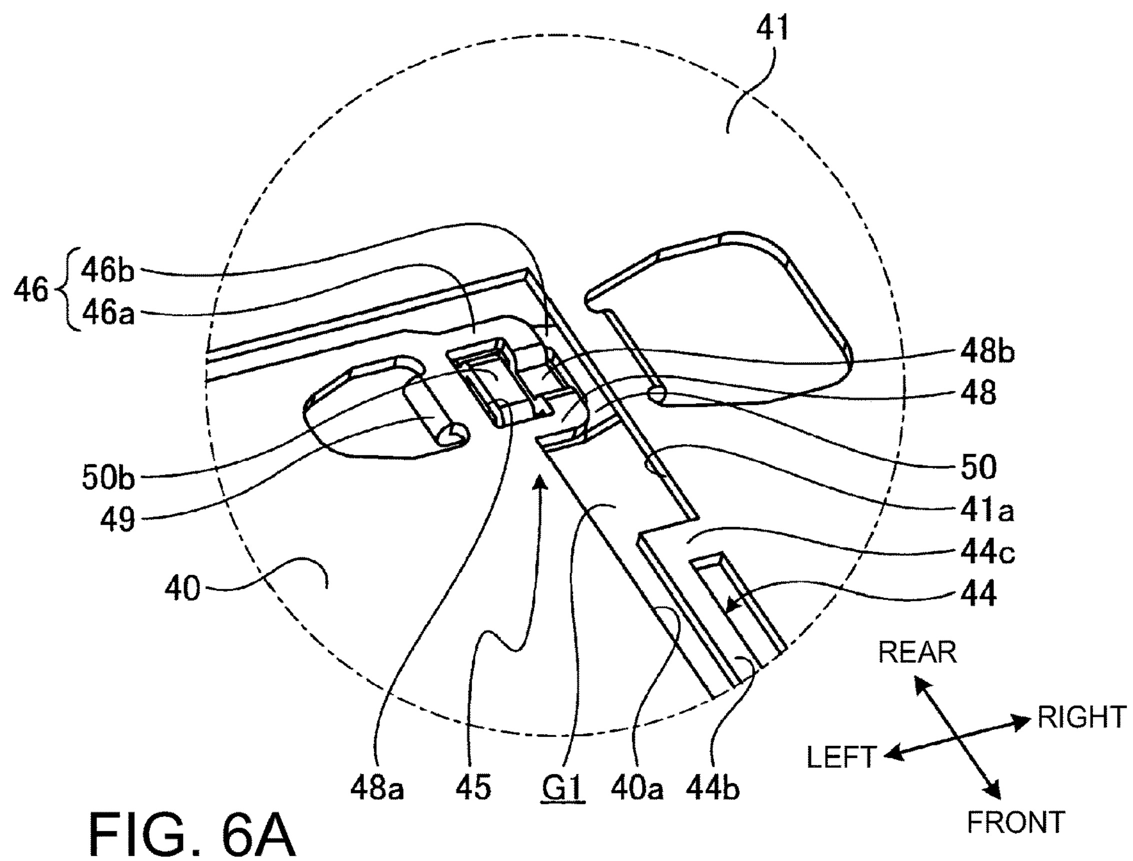
FIG. 6A is an enlarged perspective view of a part enclosed by a circle VI in FIG. 4.
Figure 6B:
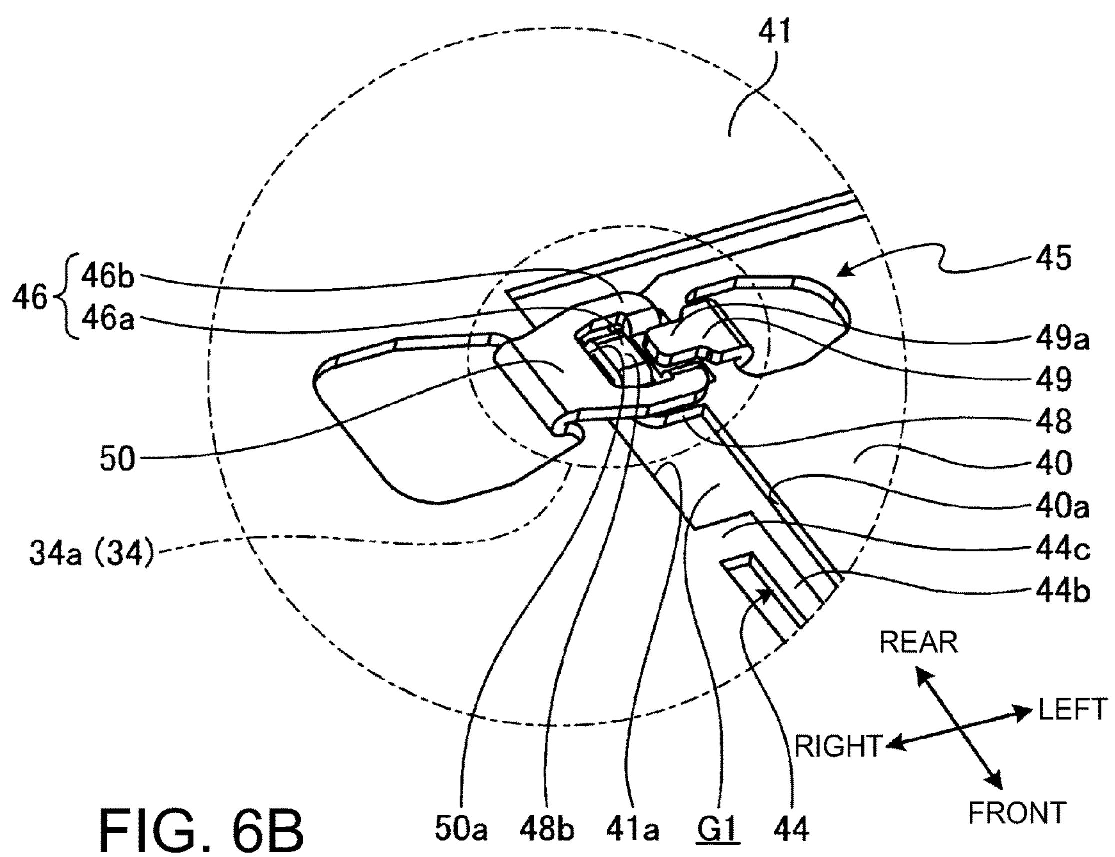
FIG. 6B is a perspective view of a bridge illustrated in FIG. 6A, the bridge being observed from the lower surface side of the baseplate.
Figure 7:
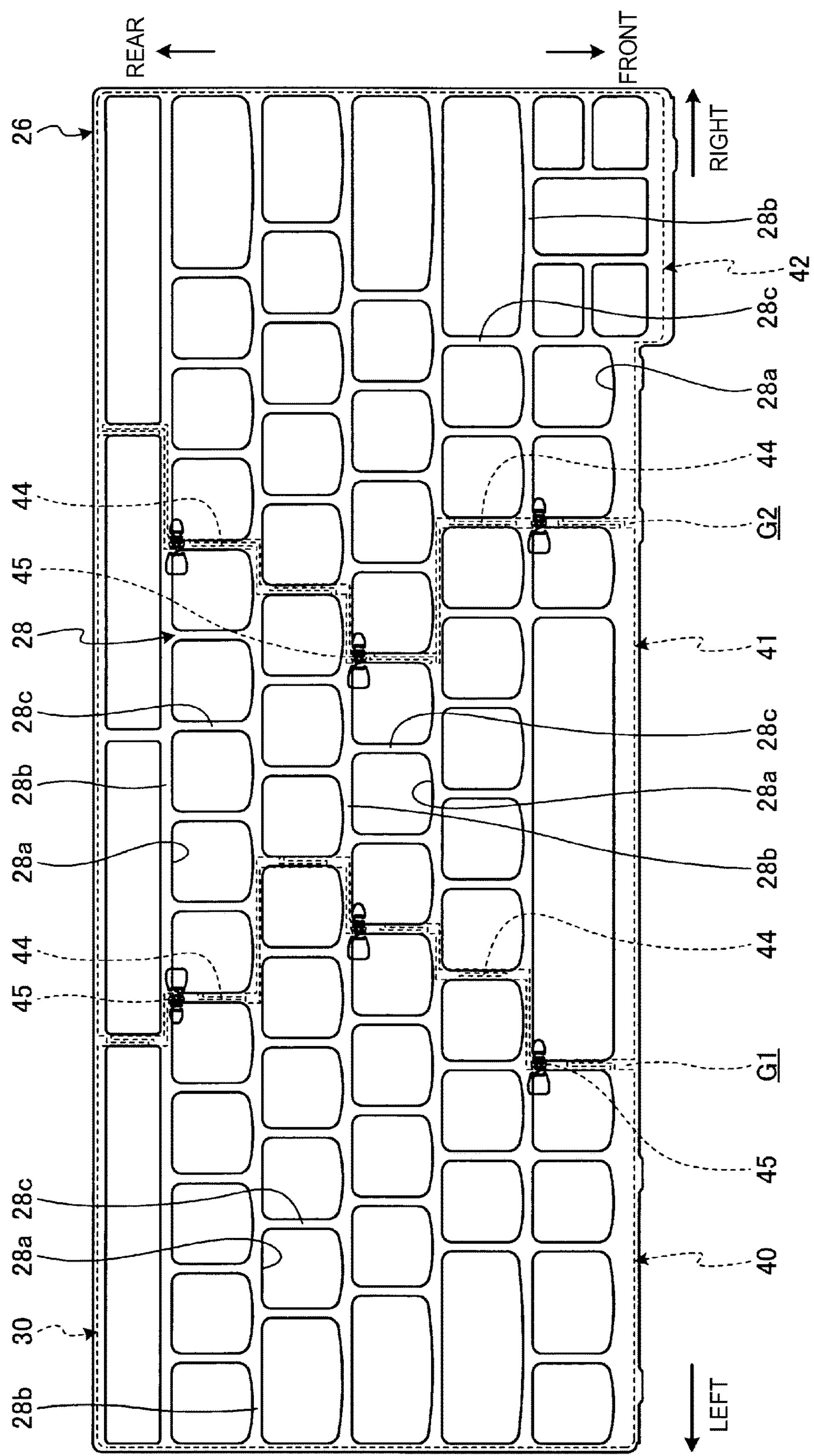
FIG. 7 is a top view of a frame placed on the upper surface side of the baseplate.

FIG. 4 is a top view of the baseplate 30. FIG. 5A is an enlarged perspective view of a part enclosed by a circle VA in FIG. 4. FIG. 5B is an enlarged perspective view of a part enclosed by a circle VB in FIG. 4. FIG. 6A is an enlarged perspective view of a part enclosed by a circle VI in FIG. 4. FIG. 6B is a perspective view of a bridge 45 illustrated in FIG. 6A, the bridge 45 being observed from the lower surface side of the baseplate 30. FIG. 7 is a top view of the frame 26 placed on the upper surface side of the baseplate 30.

Referring to FIG. 4, the baseplate 30 is shown to include a split structure, in which three plate members 40, 41 and 42, are disposed side by side along the longer direction (lateral direction). The adjacent plate members 40 and 41, and 41 and 42 are connected by a plurality of bridges 44 and 45.

The plate member 40 is a plate that constitutes the left portion of the baseplate 30. The plate member 41 is a plate that constitutes the central portion of the baseplate 30. The plate member 42 is a plate that constitutes the right portion of the baseplate 30. The adjacent plate members 40 and 41 are disposed between end surfaces 40*a* and 41*a*, which face against each other, via a gap G1. Similarly, the adjacent plate members 41 and 42 are disposed between end surfaces 41*b* and 42*a*, which face against each other, via a gap G2.

The end surfaces 40*a*, 41*a* and the end surfaces 41*b*, 42*a* face against each other in a zigzag shape that bends in the longitudinal direction and the lateral direction. Thus, the gaps G1 and G2 define the plate members 40 to 42 by the zigzag shape that bends in the longitudinal direction and the lateral direction.

The bridges 44 and 45 connect the adjacent plate members 40 and 41 and the plate members 41 and 42 such that the adjacent plate members are relatively movable in the arranged direction (lateral direction) of the plate members 40 to 42. In other words, the adjacent plate members 40 and 41 and the plate members 41 and 42 are connected such that the plate members can mutually move relative to each other in a direction in which the gaps G1 and G2 laterally expand and contract through the bridges 44 and 45.

The bridges 44 are provided, for example, six each for the gaps G1 and G2 and are placed in the gaps G1 and G2. The bridges 44 are, for example, narrow plates which have an approximately Z shape in a planar view and which are left partly uncut when the plate members 40 and 41 and the plate members 41 and 42 are cut apart along the gaps G1 and G2.

Referring to FIG. 5A, each of the bridges 44 connecting the plate members 40 and 41 has a support arm 44*a*, an elastic arm 44*b* and a support arm 44*c*. The support arm 44*a* is a plate strip that projects from an end surface 40*a* of the plate member 40 toward an end surface 41*a* facing against the end surface 40*a*. The support arm 44*c* is a plate strip that projects from an end surface 41*a* of the plate member 41 toward an end surface 40*a* facing against the end surface 41*a*. The elastic arm 44*b* is a band-shaped plate that extends in the longitudinal direction along the gap G1 so as to connect the distal ends of the support arms 44*a* and 44*c*. Referring to FIG. 5B, the bridge 44 that connects the plate members 41 and 42 has the same structure as that of the bridge 44 illustrated in FIG. 5A except that the elastic arm 44*b* is longer. Alternatively, the bridge 44 illustrated in FIG. 5A and the bridge 44 illustrated in FIG. 5B may share exactly the same structure.

In the bridges 44, the elastic arms 44*b* are provided in the gaps G1 and G2 along the longitudinal direction of the gaps G1 and G2, the support arms 44*a* are provided on one ends of the elastic arms 44*b*, and the support arms 44*c* are provided on the other ends of the elastic arms 44*b*. The bridges 44 configured as described above are elastically deformable in the lateral direction in which the plate members 40 and 41 and the plate members 41 and 42 move toward or away from each other. In other words, the bridges 44, especially the elastic arms 44*b*, constitute elastic members (members like leaf springs) that can elastically deform along the lateral direction in which the plate members 40 to 42 move toward or away from each other. As compared with bridges 45 and 60, which will be discussed later, the bridges 44 do not project in the direction of the thickness of the plate members 40 to 42, thus being expected to contribute to a decrease m thickness.

The bridges 45 are provided, for example, three each for the gaps G1 and G2, and are disposed in the gaps G1 and G2. The bridges 45 are engagement parts that are formed by cutting and raising the plate members 40 and 41 and the plate members 41 and 42, which constitute the gaps G1 and G2, and then engaged. In the case of the configuration example illustrated in FIG. 4 the bridges 45, except the bridge 45 enclosed by the circle VI, have shapes that are laterally inverted from the shape of the bridge 45 enclosed by the circle VI. Alternatively, all the bridges 45 may, of course, share the same shape, or two or more bridges 45 may have the shapes that are laterally inverted.

Referring to FIGS. 6A-6B, the bridge 45 has a slide member 46, which is slidable within a predetermined slide range along the arranged direction (lateral direction) of the plate members 40 to 42. The slide member 46 has a first engagement section 46*a* and a second engagement section 46*b*.

The first engagement section 46*a* extends from the one plate member 40 (41, 42) toward the other plate member 41 (40, 41). The first engagement section 46*a* has a lock arm 48 provided substantially flush with the upper surface of the baseplate 30, and a guide arm 49 provided at a level that is lower than the lower surface of the baseplate 30 by the thickness of the plate. As illustrated in FIG. 6A, the lock arm 48 is a rectangular annular plate piece extending from the end surface 40*a* toward the opposing end surface 41*a*. The lock arm 48 has a slide opening 48*a* at the center thereof and a lock portion 48*b*, which is provided at the distal end thereof and which is recessed downward. As illustrated in FIG. 6B, the guide arm 49 is a plate piece formed by cutting and raising a part of the plate member 40 (41, 42) and folding the part to the position where the guide arm 49 overlaps the bottom of the lock arm 48. The guide arm 49 has, at the distal end thereof, a narrow guide piece 49*a*.

The second engagement section 46*b* extends from the other plate member 41 (40, 41) toward the one plate member 40 (41, 42). The second engagement section 46*b* has an engagement arm 50 provided at a level that is lower than the lower surface of the baseplate 30 by the thickness of the plate. The engagement arm 50 is a rectangular annular plate piece formed by cutting and raising a part of the plate member 41 (40, 41) and folding the part to a position where the engagement arm 50 overlaps the bottom of the gap G1 (G2). The engagement arm 50 has a slide opening 50*a* at the center thereof and a lock portion 50*b*, which is provided at the distal end thereof and which is recessed upward.

The lock portion 50*b* of the second engagement section 46*b* of the slide member 46 is inserted in the slide opening 48*a* of the first engagement section 46*a* such that the lock portion 50*b* is slidable in the lateral direction (refer to FIG. 6A), and the lock portion 48*b* of the first engagement section 46*a* is inserted in the slide opening 50*a* of the second engagement section 46*b* such that the lock portion 48*b* is slidable in the lateral direction (refer to FIG. 6B). Further, in the slide member 46, the guide piece 49*a* of the first engagement section 46*a* is disposed at the recessed portion on the lower surface side of the lock portion 50*b* of the second engagement section 46*b* such that the guide piece 49*a* is slidable in the lateral direction (refer to FIG. 6B). Thus, the first engagement section 46*a* and the second engagement section 46*b* are engaged such that the lock portions 48*b* and 50*b* thereof are slidable in the slide range along the lateral direction restricted by the inner walls of the slide openings 50*a* and 48*a*. In other words, the slide member 46 connects the adjacent plate members 40 and 41 and the plate members 41 and 42 slidably within the predetermined slide range.

Referring to FIG. 7, in the baseplate 30, the gaps G1 and G2 are provided at the positions where the gaps G1 and G2 overlap the bottom of the frame section 28 of the frame 26. In other words, the gaps G1 and G2 pass under the horizontal frame portions 28*b* and the vertical frame portions 28*c*, avoiding passing under the openings 28*a* of the frame section 28. Further, the bridges 44 and 45 are provided at the positions where the bridges 44 and 45 overlap the bottom of the frame section 28 of the frame 26. This arrangement prevents the gaps G1 and G2 and the bridges 44 and 45 from being placed under the keytops 24, thus enabling the membrane sheet 32, which is pressed by the rubber domes 38, to be made flat. Thus, the membrane sheet 32 can be securely pressed by the rubber domes 38.

In the bridge 45, the guide arm 49 and the engagement arm 50 project on the lower surface side of the baseplate 30 (refer to FIG. 6B). For this reason, the backlight sheet 34 on the lower surface side of the baseplate 30 is provided with relief holes 34*a* at places where interference with the bridges 45 takes place, and the guide arms 49 and the engagement arms 50 are disposed in the relief holes 34*a* (refer to FIG. 6B). This arrangement prevents an increase in the thickness of the entire keyboard device 10. In addition, the bridges 45 are disposed at positions on the franc section 28 which overlap the bottoms of the horizontal frame portions 28*b* of the frame section 28, i.e., at positions offset in the longitudinal direction from the centers of the openings 28*a*. The light of the backlight sheet 34 in the present embodiment is radiated in the lateral direction, thus averting the situation in which the relief holes 34*a* are disposed under the horizontal frame portions 28*b* and the relief holes 34*a* block the light radiated in the lateral direction to the keys 22, causing the keys 22 to be inadequately illuminated.

As illustrated in FIG. 4, the plate members 40 to 42 constituting the baseplate 30 are provided with positioning fitting parts 52 and latch fitting parts 54 at places.

Figure 8A:
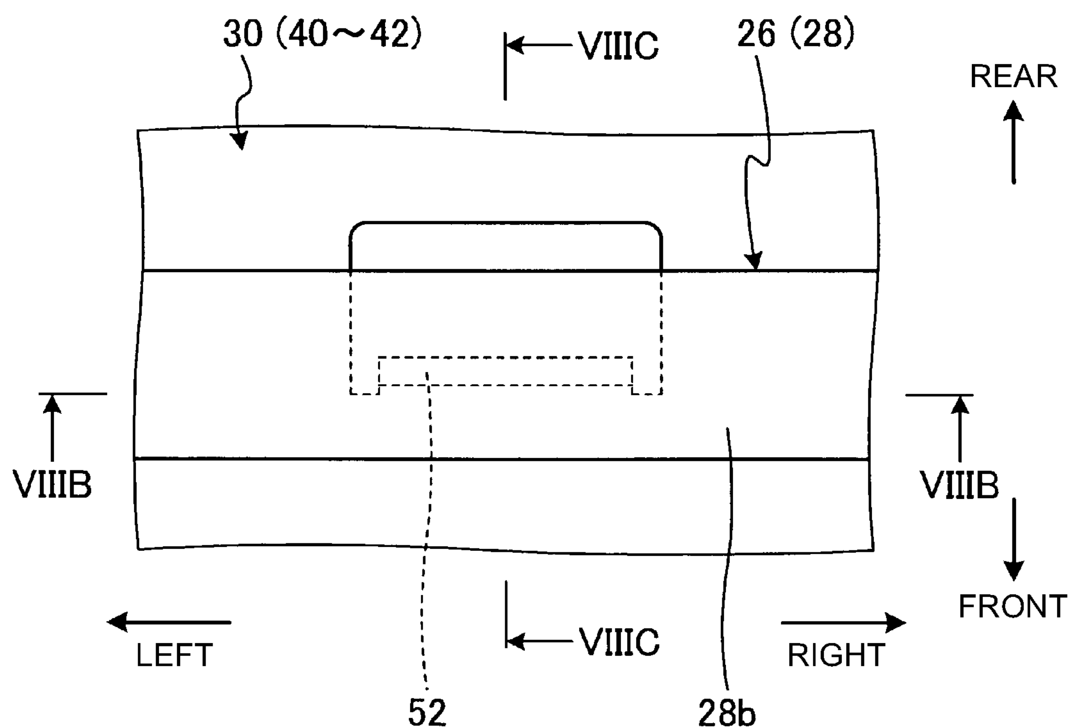
FIG. 8A is a top view of the baseplate and the frame positioned at a positioning fitting part.
Figure 8B:
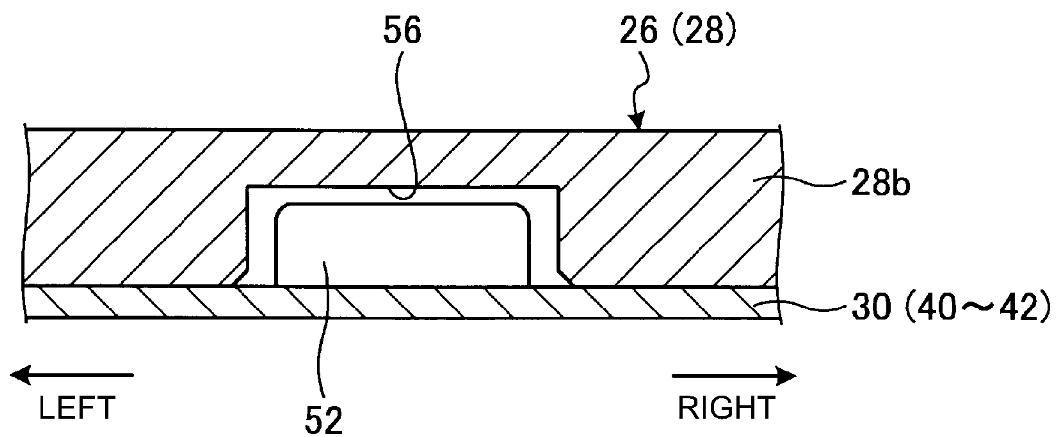
FIG. 8B is a sectional view taken along line VIIIB-VIIIB in FIG. 8A.
Figure 8C:
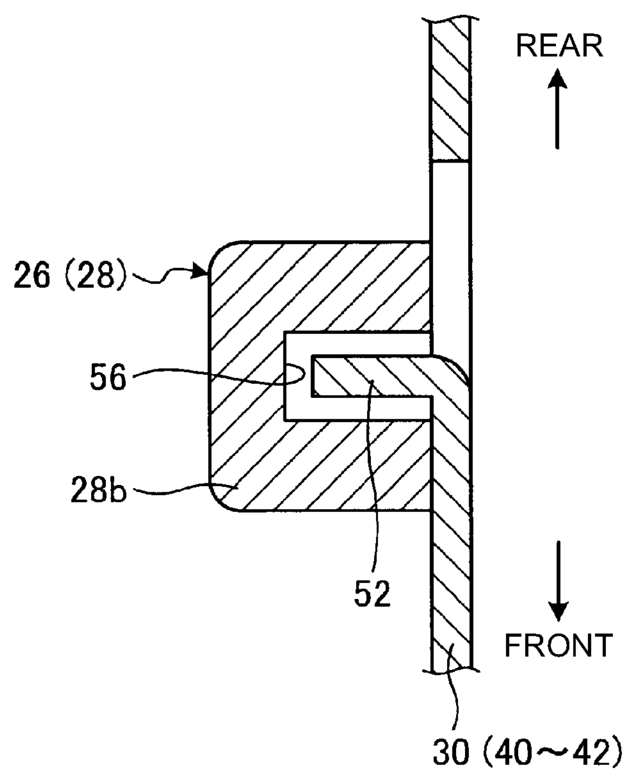
FIG. 8C is a sectional view taken along line VIIIC-VIIIC in FIG. 8A.
Figure 9A:
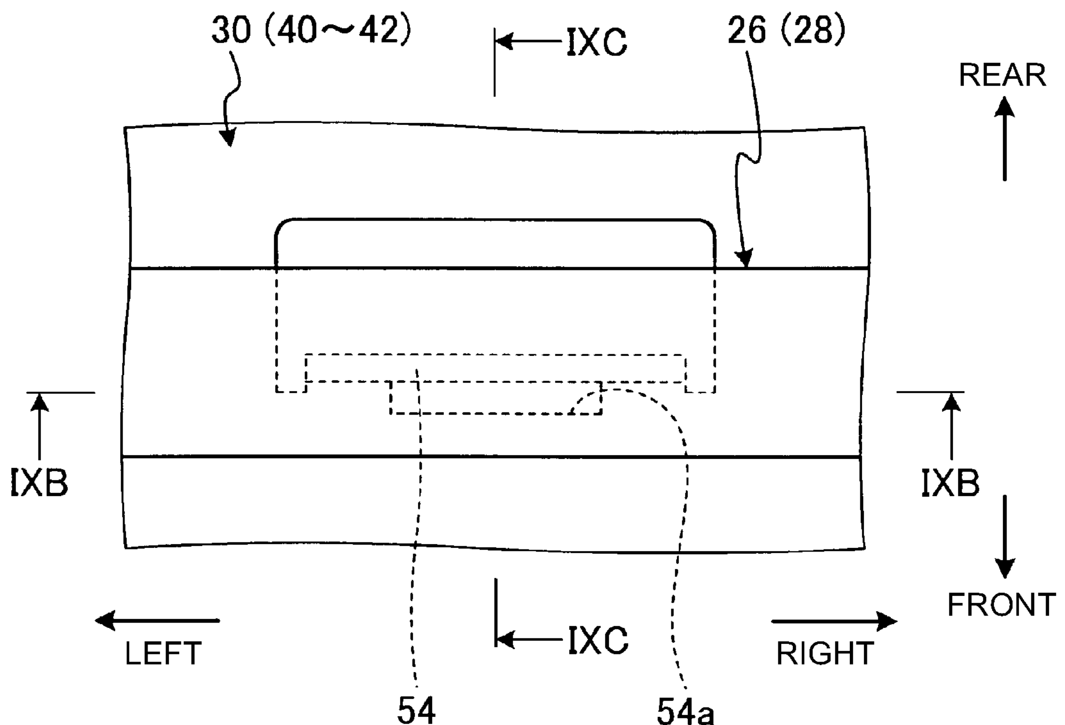
FIG. 9A is a top view of the baseplate and the frame fixed by a latch fitting part.
Figure 9B:
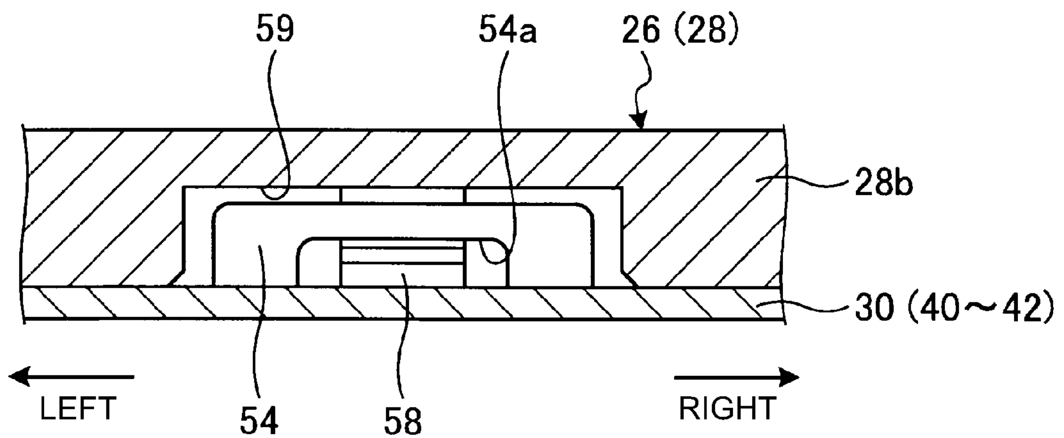
FIG. 9B is a sectional view taken along line IXB-IXB in FIG. 9A.
Figure 9C:
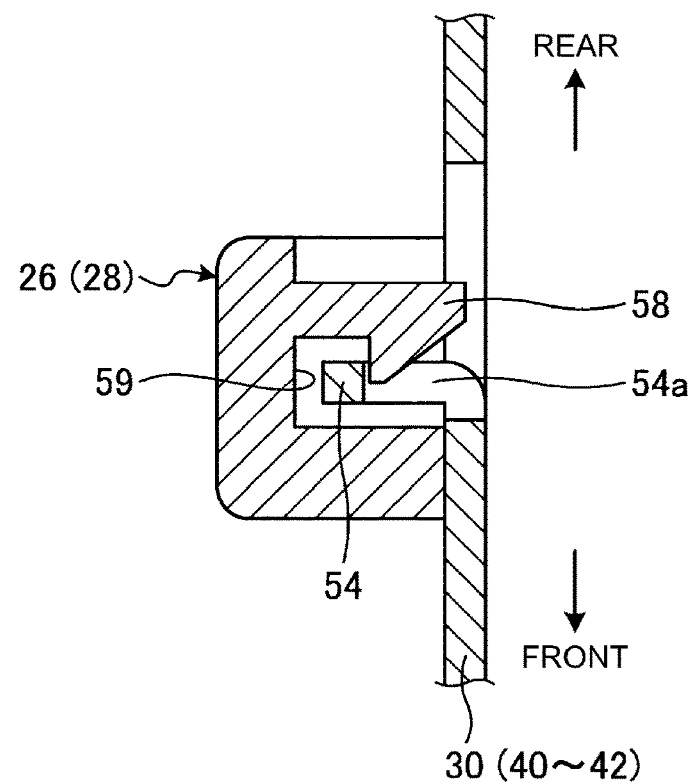
FIG. 9C is a sectional view taken along line IXC-IXC in FIG. 9A.
Figure 9D:
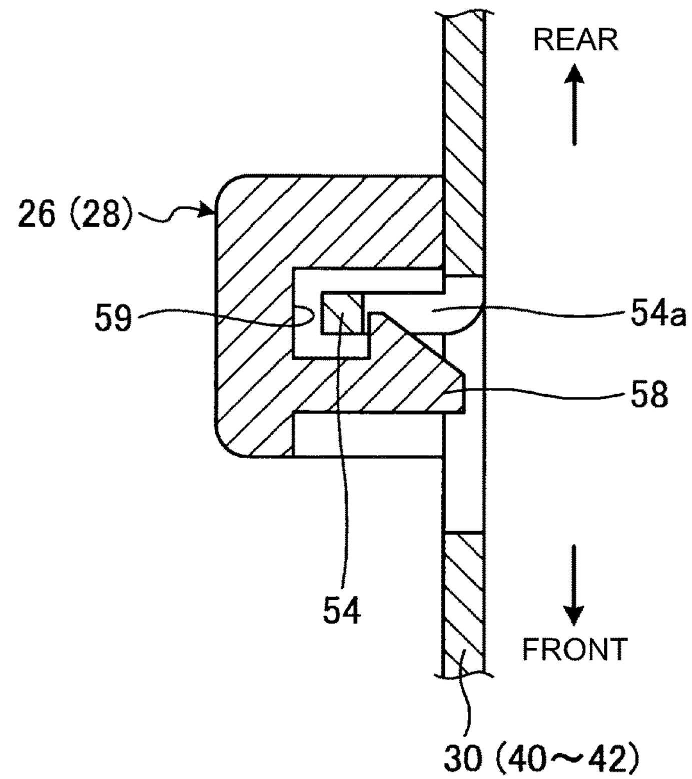
FIG. 9D is a sectional view of the baseplate and the frame fixed by a latch fitting part having a configuration that has been inverted in the longitudinal direction from the one illustrated in FIG. 9C.

FIG. 8A is a top view of the baseplate 30 and the frame 26 positioned by the positioning fitting part 52. FIG. 8B is a sectional view taken along line VIIIB-VIIIB in FIG. 8A. FIG. 8C is a sectional view taken along line VIIIC-VIIIC in FIG. 8A. FIG. 9A is a top view of the baseplate 30 and the frame 26 fixed by the latch fitting part 54. FIG. 9B is a sectional view taken along line IXB-IXB in FIG. 9A. FIG. 9C is a sectional view taken along line IXC-IXC in FIG. 9A. FIG. 9D is a sectional view of the baseplate 30 and the frame 26 fixed by the latch fitting part 54 having a configuration that has been inverted in the longitudinal direction from the one illustrated in FIG. 9C. FIG. 8A to FIG. 9D do not illustrate the membrane sheet 32 and the backlight sheet 34.

As illustrated in FIG. 4, the positioning fitting parts (positioning parts) 52 are provided three each for the plate members 40 to 42. The positioning fitting parts 52 are arranged in the longitudinal direction along centerlines O1, O2 and O3 indicating the centers in the lateral direction of the plate members 40 to 42. Alternatively, the positioning fitting parts 52 may be provided one or two each or four or more each for the plate members 40 to 42, and may be provided at positions other than the centerlines O1 to O3.

As illustrated in FIGS. 8A to 8C, each of the positioning fitting parts 52 is a plate piece formed by cutting and raising upward a part of the plate member 40 (41, 42). Each of the positioning fitting parts 52 has, for example, a width dimension in the lateral direction, and the thickness of the plate member 40 (41, 42) provides the thickness in the longitudinal direction of the positioning fitting part 52. According to the present embodiment, the positioning fitting parts 52 are provided at positions where the positioning fitting parts 52 overlap the bottoms of the horizontal frame portions 28*b* of the frame 26. The lower surface of each of the horizontal frame portions 28*b* is provided with a fitting recessed portion 56 at the position that matches the positioning fitting part 52.

When the positioning fitting part 52 is fitted to the fitting recessed portion 56, the positioning fitting part 52 can be positioned in the longitudinal direction with a backlash of a predetermined range (e.g., a total of approximately 0.1 mm in the longitudinal direction) (refer to FIG. 80). Further, when the positioning fitting part 52 is fitted to the fitting recessed portion 56, the positioning fitting part 52 can be positioned in the lateral direction with a backlash of a predetermined range (e.g., approximately a total of 0.1 mm in the lateral direction) (refer to FIG. 8B). FIGS. 8B and 8C illustrate the gap between the positioning fitting part 52 and the fitting recessed portion 56 in an exaggerated and enlarged manner; however, the actual gap is set to approximately 0.1 mm in total in the longitudinal direction or in total in the lateral direction.

As illustrated in FIG. 4, a set of the latch fitting parts 54 are provided at several places in each of the plate members 40 to 42. According to the present embodiment, there are provided a greater number of the latch fitting parts 54 than the number of the positioning fitting parts 52.

As illustrated in FIGS. 9A to 9C, the latch fitting parts 54 are plate pieces formed by cutting and raising upward a part of the plate member 40 (41, 42). Each of the latch fitting parts 54 has, for example, a width dimension in the lateral direction, and the thickness of the plate member 40 (41, 42) provides the thickness in the longitudinal direction of the positioning fitting part 52. The latch fitting part 54 is shaped like a gate having a lock hole 54*a* opened on the inner side thereof. The latch fitting part 54 according to the present embodiment is provided at a position where the latch fitting part 54 overlaps the bottom of the horizontal frame portion 28*b* of the frame 26. The lower surface of the horizontal frame portion 28*b* is provided with a hook 58 and a fitting recessed portion 59 at positions corresponding to the latch fitting part 54.

When latch fitting part 54 is fitted to the fitting recessed portion 59, the hooking portion of the hook 58 is locked in the lock hole 54*a*. This locks the latch fitting part 54 and the hook 58 to prevent slippage in the vertical direction. According to the present embodiment, latch fitting parts 54, the hooks 58, and the fitting recessed portions 59 that have shapes inverted in the longitudinal direction as illustrated in FIG. 9D are also provided as appropriate. Arranging the latch fitting parts 54 oriented as illustrated in FIG. 9C and the latch fitting parts 54 oriented as illustrated in FIG. 9D, for example, alternately by one row or in a zigzag layout makes it possible to further securely lock the baseplate 30 and the frame 26.

To install the frame 26 to the baseplate 30, the positioning fitting parts 52 provided along the centerlines O1 to O3 of the plate members 40 to 42 are, for example, fitted to the fitting recessed portions 56 of the frame 26. Then, the hooking portions of the hooks 58 are locked in the lock holes 54*a* while fitting the latch fitting parts 54 to the fitting recessed portions 59. Thus, the gaps G1 and G2 between the plate members 40 to 42 expand or contract through the intermediary of the bridges 44 and 45, so that the plate members 40 to 42 are relatively moved in the arranged direction, causing the plate members 40 to 42 to be positioned with respect to the frame 26 and fixed. Thereafter, the plate members 40 to 42 and the frame 26 may be fastened using screws not illustrated).

Figure 10:
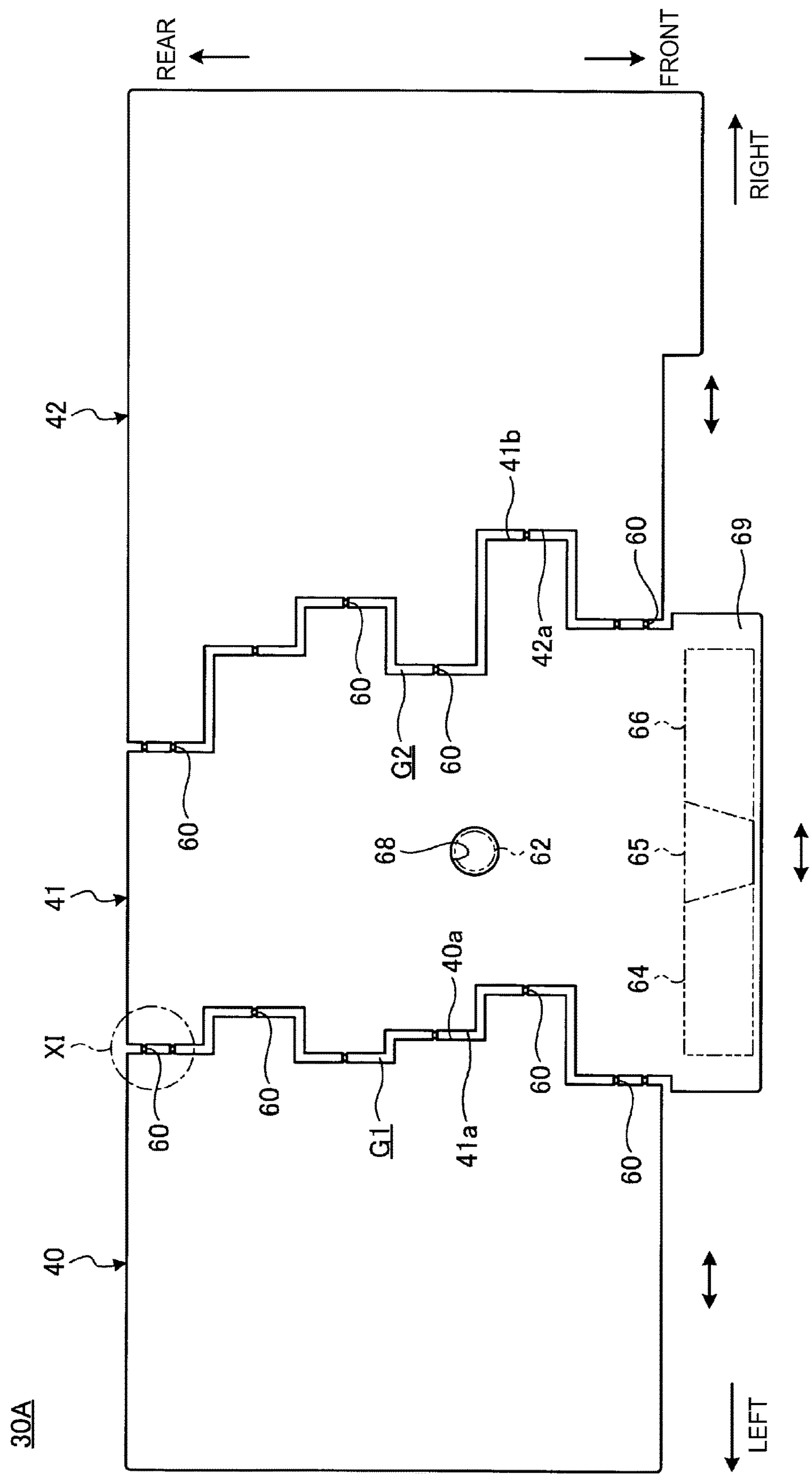
FIG. 10 is a top view of a baseplate according to a modification example.

FIG. 10 is a top view of a baseplate 30A according to a modified example. Referring to FIG. 10, the baseplate 30A differs from the baseplate 30 illustrated in FIG. 4 in that plate members 40 to 42 are connected by bridges 60 having different structures from those of the bridges 44 and 45.

Although the positioning fitting parts 52 and the latch fitting parts 43 are not illustrated in FIG. 10, the baseplate 30A also has positioning fitting parts 52 and latch fitting parts 54, as with the baseplate 30 illustrated in FIG. 4. Further, FIG. 10 illustrates the baseplate 30A configured to be compatible with a keyboard device 10 that has a pointing stick 62, which is provided together with keys 22 to replace a mouse, and buttons 64, 65 and 66, which are used together with the pointing stick 62. More specifically, the plate member 41 at the middle is provided with a through hole 68 through which the pointing stick 62 is passed, a protruding, part 69 for disposing the buttons 64 to 66 thereon. The baseplate 30A may have the same structure as that of the baseplate 30 illustrated in FIG. 4 that is not compatible with the pointing stick 62 or the like, or the baseplate 30 illustrated in FIG. 4 may be configured to be compatible with the pointing stick 62 or the like.

Figure 11:
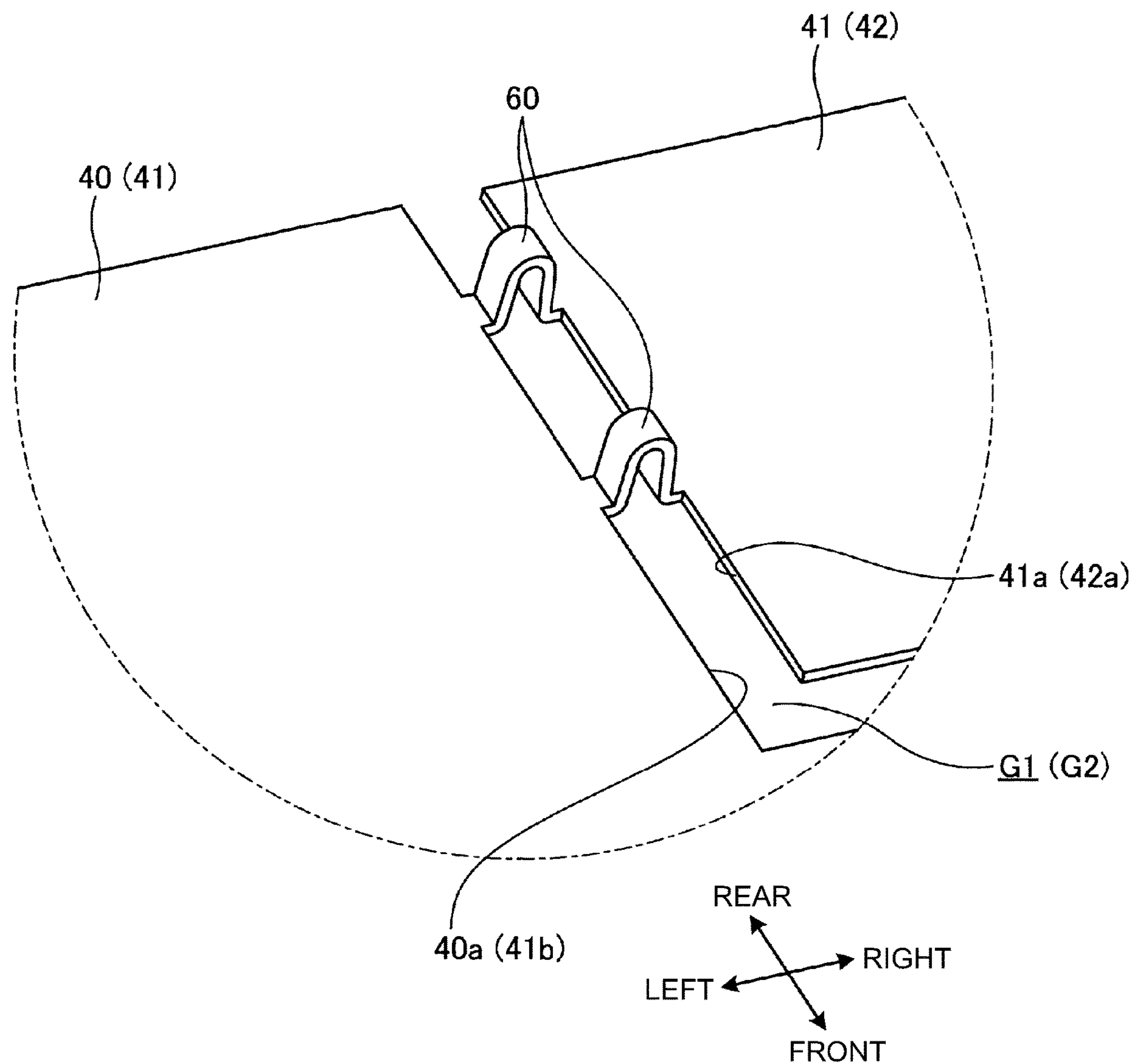
FIG. 11 is an enlarged perspective view of a part enclosed by a circle XI in FIG. 10.

FIG. 11 is an enlarged perspective view of a part enclosed by a circle XI in FIG. 10. The bridges 60 are provided, for example, eight each for gaps G1 and G2 and placed over the gaps G1 and G2. As illustrated in FIG. 11, each of the bridges 60 is formed of a narrow plate arched over the gap G1 or G2. The bridges 60 are, for example, narrow plates which have an approximately Z shape in a planar view and which are left partly uncut when the plate members 40 and 41 and the plate members 41 and 42 are cut apart along the gaps G1 and G2. The bridges 60 are housed in, for example, the recessed portions provided in the lower surfaces of horizontal frame portions 28*b* and vertical frame portions 28*c* of a frame 26. The bridges 60 are elastically deformable in the lateral direction in which the plate members 40 and 41 and the plate members 41 and 42 move toward or away from each other. In other words, the bridges 60 constitute elastic members (members like leaf springs) that can elastically deform along the lateral direction in which the gaps G1 and G2 expand or contract.

As described above, in the keyboard device 10 according to the present embodiment, the baseplate 30 (30A) has at least a plurality of plate members 40 to 42 arranged along a longer direction, and the bridges 44, 45 (60) connecting the adjacent plate members 40 to 42. Further, the adjacent plate members 40 to 42 are disposed through the gaps G1 and G2 between the end surfaces 40*a*, 41*a*, 41*b* and 42*a*, which face against each other, and can relatively move in the arranged direction of the plate members 40 to 42 through the intermediary of at least the bridges 44 and 45 (60).

Hence, the dimensional tolerances of the baseplate 30 (30A) in the longer direction (lateral direction) can be set to values based on the lateral dimensions of the plate members 40 to 42. In other words, the dimensional tolerances of the short plate members 40 to 42 can be set to be smaller than the dimensional tolerances in the case where the baseplate 30 (30A) is composed of a single long plate, thus leading to higher dimensional accuracy. For example, if the baseplate 30 (30M is formed of a single plate and the lateral dimension thereof is 300 mm, then the required dimensional tolerance in the lateral direction will be 0.2 mm or more. In contrast, the dimensional tolerance in the lateral direction of the plate members 40 to 42 of the three-split structure will be approximately 0.1 mm to 0.15 mm. Further, the plate members 40 to 42 are relatively movable in the arranged direction through the intermediary of the bridges 44 and 45 (60). Hence, clearances C (refer to FIG. 2) between the openings 28*a* of the frame 26 and the keytops 24 supported by the plate members 40 to 42 can be set to a size based on the foregoing highly accurate dimensional tolerance. As a result, the clearances C between each keytop 24 and the frame 26 can be reduced. Further, even after the clearances C are made smaller, the keytops 24 can be prevented from interfering with the frame 26, so that smooth movement of the keytops 24 can be secured. In addition, the plate members 40 to 42 of the baseplate 30 (30A) are connected through the bridges 44 and 45 (60), and the baseplate 30 (30A) can be therefore handled as a single plate in the manufacturing process, thus leading to higher manufacturing efficiency.

In this case, the positioning fitting parts 52 are disposed along the centerlines O1 to O3 of the plate members 40 to 42. This makes it possible to use the centerlines O1 to O3 as the references for positioning the plate members 40 to 42 in relation to the frame 26. As a result, the clearances C corresponding to the plate members 40 to 42 can be evenly allocated on the left and right sides of the centerlines O1 to O3, thus leading to even higher dimensional accuracy of the clearances C. For this reason, the positioning fitting parts 52 are desirably disposed at or in the vicinity of the centerlines O1 to O3.

The above description has illustrated the configuration in which the baseplate 30 uses both the bridges 44 and 45. Alternatively, however, only one of the budges 44 and 45 may be used. More specifically, the baseplate 30 may be configured such that the plate members 40 to 42 are connected by only the bridges 44 or the bridges 45. However, since the bridges 44 function as the elastic members, if an external force is applied in a direction in which the gaps G1, G2 between the plate members 40 to 42 are significantly expanded during, for example, the manufacturing process or the like, then the bridges 44 may be plastically deformed and fail to restore their original shapes. This plastic deformation problem can be averted by using the bridges 44 in combination with the bridges 45 functioning as stoppers that have a restricted slide range. Similarly, the bridges 60 may be used in combination with the bridges 45. All the bridges 44, 45 and 60 can, of course, be used together.

In the keyboard device 10, the gaps G1 and G2 have a zigzag shape that bends in the longer direction (lateral direction) of the baseplate 30 (30A) and in the shorter direction (longitudinal direction) orthogonal to the longer direction. More specifically, it is assumed that the gaps G1 and G2 have a linear shape along the longitudinal direction. In this case, if, for example, the left end portion of the plate member 40, which is one end portion of the baseplate 30 (30A), is held and lifted, then the plate members 40 to 42 bend due to their own weights or the like at the gaps G1 and G2, and the bridges 44, 45 or 60 may be damaged. In this respect, the keyboard device 10 has the gaps G1 and G2 shaped in the zigzag pattern, so that the load due to the self-weight or the like does not linearly act on the gaps G1 and G2, thus making it possible to restrain the damage caused by the bending described above. The gaps G1 and G2 may, of course, have a linear shape rather than the zigzag shape, depending on, for example, a manufacturing process or the specifications of the baseplate 30 (30A).

Figure 12:
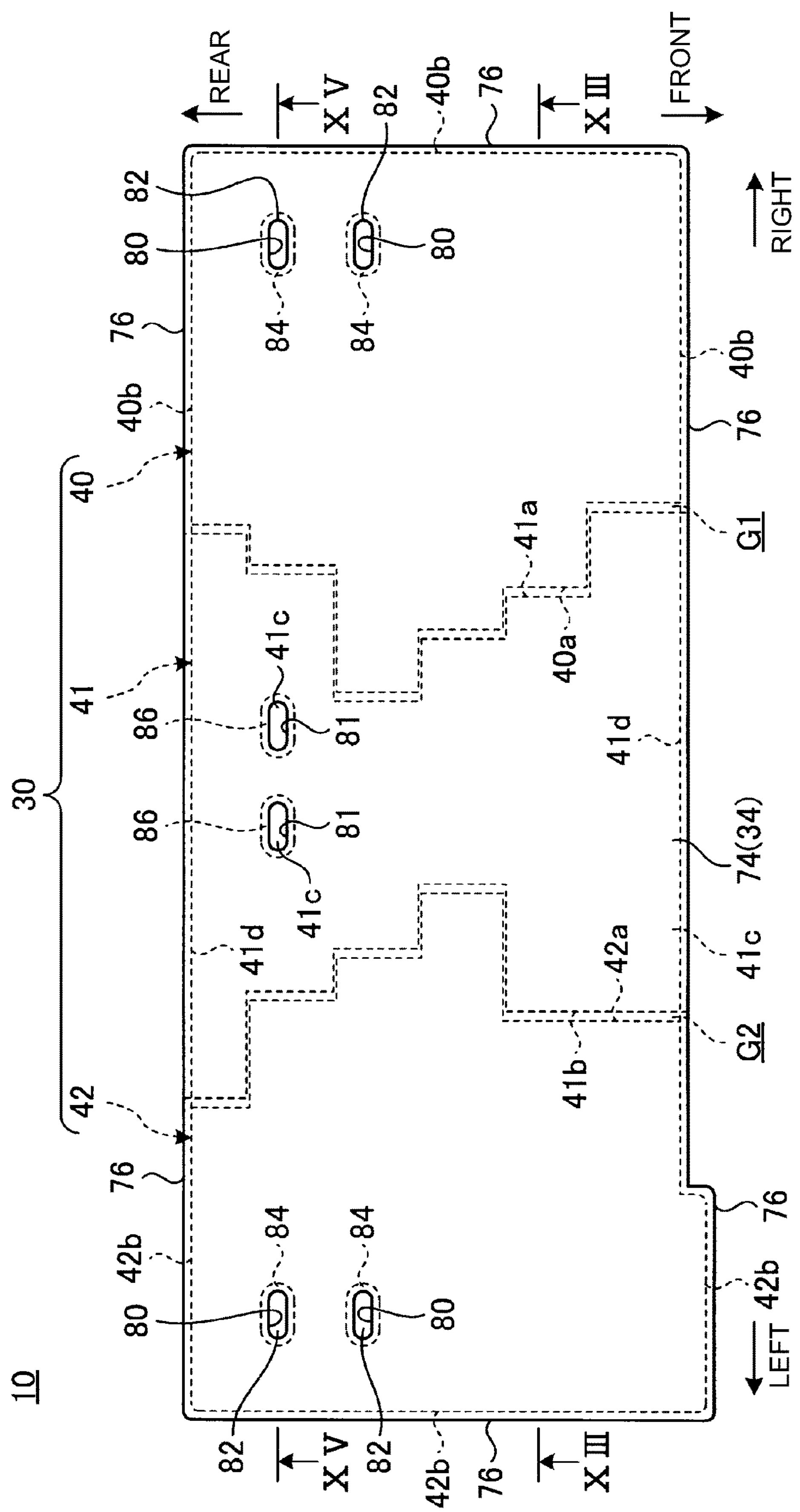
FIG. 12 is a bottom view of the keyboard device.
Figure 13:
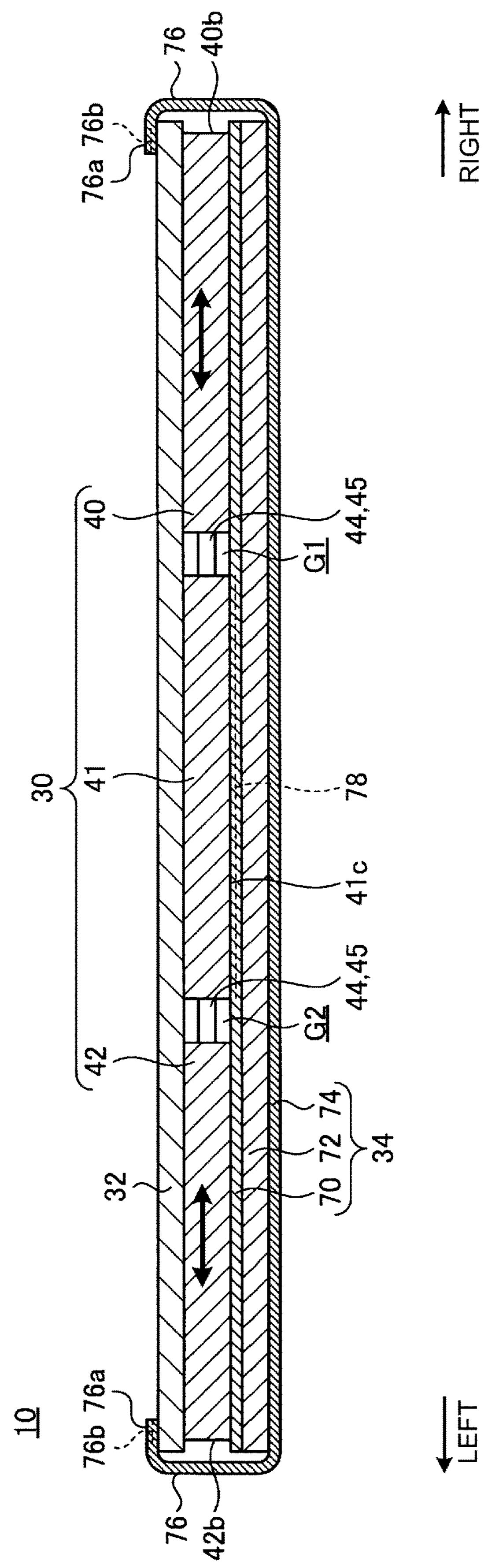
FIG. 13 is a side sectional view of the structure taken along line XIII-XIII in FIG. 12.
Figure 14:
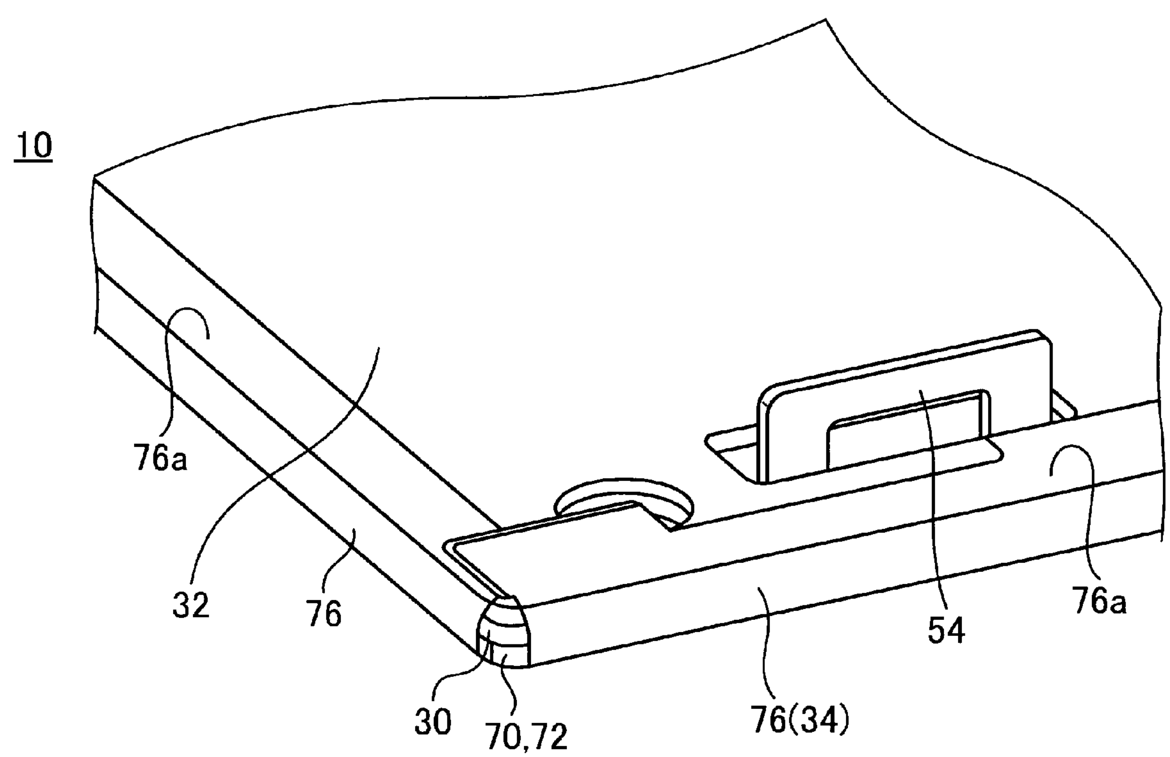
FIG. 14 is an enlarged perspective view of an edge part of the keyboard device illustrated in FIG. 12.
Figure 15:
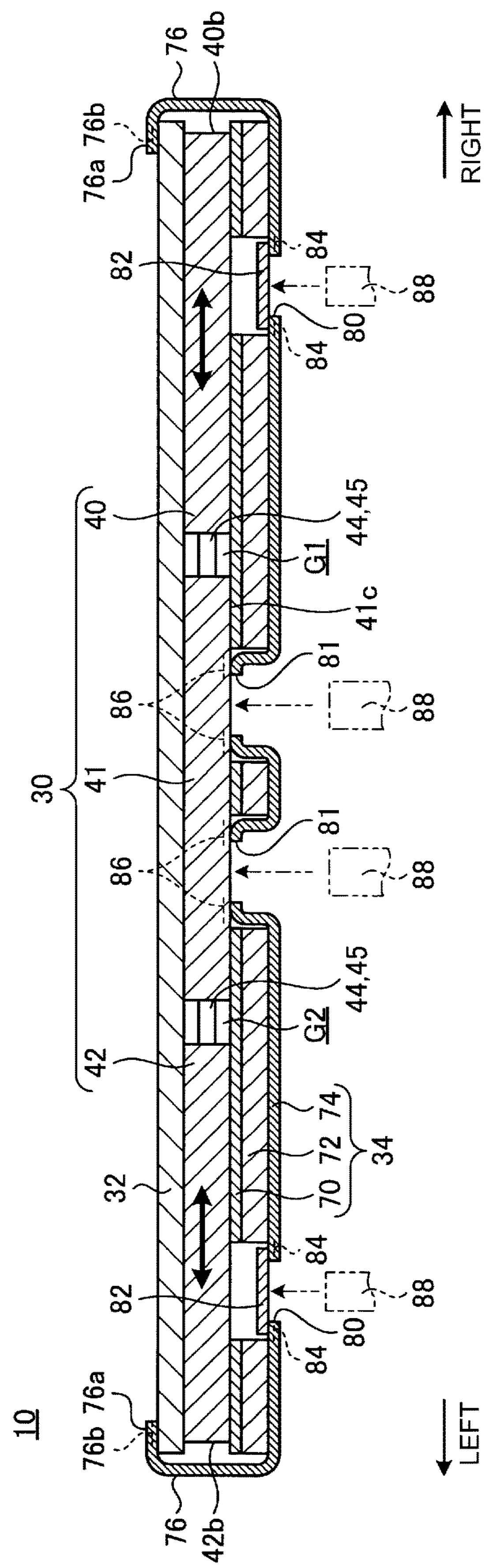
FIG. 15 is a side sectional view of the structure taken along line XV-XV in FIG. 12.

FIG. 12 is a bottom view of the keyboard device 10. FIG. 13 is a side sectional view schematically illustrating the structure taken along line in FIG. 12. FIG. 14 is an enlarged perspective view illustrating an edge part of the keyboard device 10 illustrated in FIG. 12. FIG. 15 is a side sectional view schematically illustrating the structure taken along line XV-XV in FIG. 12. FIG. 13 to FIG. 15 do not illustrate the keys 22 and the frame 26. The following will representatively describe the configuration that uses the baseplate 30 illustrated in FIG. 4. However, the configuration illustrated in FIG. 12 to FIG. 15 may be used for the baseplate 30A illustrated in FIG. 10.

Referring to FIGS. 12 and 13, the backlight sheet 34 according to the present embodiment may be composed of a sheet-like member having three layers, namely, a masking sheet 70, a light guide plate 72, and a reflection sheet 74, which are deposited downward in this order from the lower surface side of the baseplate 30. These sheets 70 and 74, and the light guide plate 72 are adhesively fixed into a single plate by, for example, an adhesive agent, a double-sided tape or the like. The relief holes 34*a* illustrated in FIG. 6B are desirably formed in, for example, the masking sheet 70 and the light guide plate 72 but not to penetrate to the reflection sheet 74.

The light guide plate 72 is a plate adapted to guide the light emitted from a light source, which is disposed at the lateral center or a lateral end, in the lateral direction. The light guide plate 72 is formed of a resin material, such as acrylic, which has translucency, as described above. The reflection sheet 74 is a light reflection sheet that reflects the light, which has been guided in the lateral direction by the light guide plate 72, off of its upper surface. The masking sheet 70 is a light shielding sheet formed to have a shape that is approximately the same as the shape of the frame 26 to restrict the irradiation range of the light emitted upward from the light guide plate 72 so as to radiate the light only to the keys 22.

The backlight sheet 34 has bent portions 76 on a part of the outer peripheral edge of the reflection sheet 74, which is the lowermost layer. According to the present embodiment, the bent portions 76 are provided at positions corresponding to outer peripheral end surfaces 40*b* and 42*b* of three sides other than the end surfaces 40*a* and 42*a* of the plate members 40 and 42 at both right and left ends. The bent portions 76 are formed by extending the outer peripheral edge of the reflection sheet 74 outward beyond the masking sheet 70 and the light guide plate 72 and then by bending the outer peripheral edge upward, enclosing therein the outer peripheral end surfaces 40*b* and 42*b* (refer to FIG. 13 and FIG. 14). Each of the bent portions 76 is adhesively fixed to the upper surface edge portion of the membrane sheet 32 by using an adhesive portion 76*b* provided on the inner surface of an end portion 76*a*. The adhesive portion 76*b* uses, for example, an adhesive agent or a double-sided tape. The backlight sheet 34 is not adhesively fixed to the right and left plate members 40 and 42. Thus, the plate members 40 and 42 are accommodated between the reflection sheet 74, which is formed like a pouch by the bent portions 76, and the membrane sheet 32, such that the plate members 40 and 42 are movable in the lateral direction.

Referring to FIG. 13, the outer peripheral end surfaces 40*b* and 42*b* of the right and left plate members 40 and 42 are offset by, for example, approximately 0.2 mm to 0.4 mm to the inner side from the outer peripheral end surfaces of the membrane sheet 32 and the backlight sheet 34. With this arrangement, even in the case of a configuration in which, for example, the adhesive portions 76*b* are provided on the entire inner surfaces of the bent portions 76, it is possible to prevent the adhesive portions 76*b* from being erroneously adhesively fixed to the outer peripheral end surfaces 40*b* and 42*b* of the plate members 40 and 42.

The backlight sheet 34 is fixed to a lower surface 41*c* of the middle plate member 41. In the backlight sheet 34, the masking sheet 70, which is the uppermost layer, and the upper surface of the light guide plate 72 facing the opening of the masking sheet 70, for example, are adhesively fixed to the lower surface 41*c* of the plate member 41 by using an adhesive portion 78. As the adhesive portion 78, an adhesive agent or a double-sided tape, for example, is used. The adhesive portion 78 may be disposed on the entire area of the lower surface 41*c*, or only on a part of the lower surface 41*c*. However, the adhesive portion 78 is desirably disposed on the outer peripheral edge except for at least the area along the end surfaces 41*a* and 41*b* of the lower surface 41*c* of the plate member 41, i.e., over the full lengths of the two sides except for the end surfaces 41*a* and 41*b*. In the plate member 41, wall portions 41*d* are formed by raising and bending upward the two sides of the plate member 41, except the end surfaces 41*a* and 41*b*, and the adhesive portion 78 is provided on the lower surface 41*c* on the rear surface side of the wall portions 41*d*. For the middle plate member 41 also, the outer peripheral end surfaces of the two sides except the end surfaces 41*a* and 41*b* may be wrapped by the bent portions 76 without fixing the plate member 41 to the backlight sheet 34.

As described above, in the keyboard device 10, the right and left plate members 40 and 42 are accommodated in a movable manner between the membrane sheet 32 and the backlight sheet 34, and the middle plate member 41 is fixed to the backlight sheet 34. In other words, the keyboard device 10 has the right and left plate members 40 and 42, which are retained by the bent portions 76 in a laterally movable manner, and has the assembly part composed of the membrane sheet 32, the baseplate 30, and the backlight sheet 34, which are layered into one piece. Thus, the assembly part can be smoothly installed and fixed to the frame 26 even when the plate members 40 to 42 are formed with a highly accurate dimensional tolerance. More specifically, the assembly part is installed to the frame 26 by, for example, positioning and fixing the middle plate member 41 with respect to the frame 26 and then adjusting the positions of the plate members 40 and 42 at both ends with respect to the plate member 41 in the lateral direction, thus making it possible to achieve smooth positioning and fixing with respect to the frame 26.

Further, in the keyboard device 10, the outer peripheral end surfaces 40*b* and 42*b* of the plate members 40 and 42 at both ends are sealed by the bent portions 76 of the backlight sheet 34, and the lower surface 41*c* of the middle plate member 41 is sealed by the adhesive portion 78 between the lower surface 41*c* and the backlight sheet 34. In other words, the keyboard device 10 has a bathtub-like structure, in which the outer periphery on the lower surface side of the baseplate 30 is surrounded by the backlight sheet 34. With this arrangement, even if, for example, a liquid, such as a beverage, is spilled onto the keytops 24, the keyboard device 10 can restrain the liquid from going into the main body chassis 14. The backlight sheet 34 may be omitted. For this configuration, providing a sheet-like member, such as a rubber or resinous waterproof sheet, in place of the backlight sheet 34 will provide the same waterproofing effect described above.

Referring to FIGS. 12 and 15, the backlight sheet 34 has a pair of openings 80 and 80 arranged in the longitudinal direction at the positions where the openings 80 and 80 overlap the right and left plate members 40 and 42, and also a pair of right and left openings 81 and 81 at the positions where the openings 81 and 81 overlap the middle plate member 41. The numbers and positions of the openings 80 and 81 to be set can be changed, as necessary.

As illustrated in FIG. 15, the openings 80 corresponding to the right and left plate members 40 and 42 penetrate the three layers of the backlight sheet 34 in the direction of thickness. The openings 80 are plugged by electrically conductive sheets 82. Each of the electrically conductive sheets 82 is a sheet formed of metal foil of, for example, aluminum or copper, which has high electrical conductivity, and has an external shape that is slightly larger than that of the opening 80. According to the present embodiment, the inner peripheral surfaces of the openings 80 are configured such that the inner wall surface of the reflection sheet 74 projects further inward than the inner wall surfaces of the masking sheet 70 and the light guide plate 72. The electrically conductive sheets 82 are adhesively fixed to the upper surface of the reflection sheet 74, which projects into the opening 80, by using adhesive portions 84. For the adhesive portions 84, an adhesive agent and a double-sided tape, for example, can be used.

The openings 81 corresponding to the middle plate member 41 penetrate the three layers of the backlight sheet 34 in the direction of the sheet thickness. The inner surfaces of the peripheral portions of the openings 81 are fixed to the lower surface 41*c* of the plate member 41. According to the present embodiment, the inner peripheral surfaces of the openings 81 are configured such that the inner wall surfaces of the reflection sheet 74 project further inward than the inner wall surfaces of the masking sheet 70 and the light guide plate 72. In the backlight sheet 34, the upper surface of the reflection sheet 74 projecting into the openings 81 is adhesively fixed to the lower surface 41*c* by using the adhesive portions 86. With this arrangement, only the portions of the lower surface 41*c* of the plate member 41 that face the openings 81 are exposed to the outside, whereas the peripheral edges of the openings 81 are sealed. The adhesive portions 86 may be used in combination with the adhesive portion 78 illustrated in FIG. 13. For the middle plate member 41 also, the openings 80 and the electrically conductive sheets 82 may be used without using the openings 81 and the adhesive portions 86.

The openings 80 and 81 are disposed, being opposed to electrically conductive cushions 88 adjacent to the main body chassis 14, on which the keyboard device 10 is mounted. The electrically conductive cushions 88 are electrically connected to a metal frame or the like installed in the main body chassis 14. The electrically conductive cushions 88 press the electrically conductive sheets 82, which close the openings 80, upward, and bring the upper surfaces of the electrically conductive sheets 82 into slidable contact with the lower surfaces of the plate members 40 and 42. The electrically conductive cushions 88 come in direct contact with the lower surface 41*c* of the plate member 41 through the openings 81. Therefore, in the keyboard device 10, the baseplate 30 is grounded to the main body chassis 14 through the intermediary of the electrically conductive sheets 82 at the openings 80 and the lower surface 41*c* of the plate member 41 exposed through the openings 81. This enables the keyboard device 10 to easily and securely build a current path for an electrostatic discharge (ESD) when the keyboard device 10 is installed to the electronic apparatus 12. In this case, the keyboard device 10 is configured such that the electrically conductive sheets 82 are in contact with the plate members 40 and 42, which are movable in the lateral direction. Thus, when installing and fixing the assembly part composed of the membrane Sheet 32, the baseplate 30, and the backlight sheet 34, which are layered into one piece, to the frame 26, even if the right and left plate members 40 and 42 move, the electrically conductive sheets 82 are in slidable contact with the plate members 40 and 42, thus maintaining the electrical contact therebetween. The configuration using the openings 80 and the electrically conductive sheets 82 may be applied also to the middle plate member 41.

In the above description, the configurations in which the three plate members 40 to 42 constitute the baseplate 30 or 30A have been illustrated. Alternatively, however, the number of plate members to be installed may be two, or four or more.

For example, if two plate members are installed, then the bent portions 76 illustrated in FIG. 13 may be provided on one or both of the plate members. If the bent portions 76 are provided only on one of the plate members, then the other plate member may be fixed to the backlight sheet 34 by the adhesive portion 78. Further, in the case where, for example, four or more plate members are installed, the bent portions 76 illustrated in FIG. 13 may be provided on the plate members on both ends, and one or more or all of the plate members between the plate members on both ends may be fixed to the backlight sheet 34 by the adhesive portion 78. However, the plate members which are placed between the plate members on both ends and which are not provided with the adhesive portion 78 may be provided with bent portions 76 on the outer peripheral edges that are not opposed to other plate members.

For example, if two plate members are installed, then the openings 80 and the electrically conductive sheets 82 illustrated in FIG. 15 may be provided in one or both of the plate members. If the openings 80 and the electrically conductive sheets 82 are provided in only one plate member, then the other plate member may be provided with the openings 81 and the adhesive portions 86. Further, for example, four or more plate members are installed, then the openings 80 and the electrically conductive sheets 82 illustrated in FIG. 15 may be provided on the plate members on both ends, one or more plate members between the plate members on both ends may be provided with the openings 81 and the adhesive portions 86, and the remaining plate members may be provided with the openings 80 and the electrically conductive sheets 82.

In the above description, the configurations have been illustrated, in which the plate members 40 to 42 are arranged along the longer direction (lateral direction) of the baseplates 30 and 30A. Alternatively, however, a configuration may be adopted, in which the plate members 40 to 42 are arranged in the shorter direction (longitudinal direction) in addition to or in place of the longer direction. If the keyboard device 10 is square in a planar view, then the longitudinal direction and the lateral direction can be referred to as the longer direction, and the plate members may be arranged in one or both of the longitudinal direction and the lateral direction.

As has been described, the present invention provides an improved keyboard device for an electronic apparatus.

While the invention has been particularly shown and described with reference to a preferred embodiment, it will be understood by those skilled in the art that various changes in form and detail may be made therein without departing from the spirit and scope of the invention.

What is claimed is:

1. A keyboard device comprising:

a baseplate formed by a plurality of plate members, wherein adjacent two of said plate members are connected by a plurality of bridges located in a gap provided between end surfaces of said adjacent plate members that oppose each other, and said adjacent plate members are relatively movable through said bridges in a longitudinal direction that said plate members are arranged, wherein said bridges include slide members that slid in a predetermined sliding range along at least said arranged direction, wherein one of said slide members includes a first engagement section extending from one of said adjacent plate members to another one of said adjacent plate members, and a second engagement section, extending from said another one of said adjacent plate members to said one of said adjacent plate members and is slidably engaged with said first engagement section;

a plurality of keytops supported in a vertically movable manner on an upper surface side of said baseplate; and a frame mounted on said upper surface side of said baseplate, wherein said frame includes a plurality of openings in which said keytops are inserted in a vertically movable manner.

2. The keyboard device of claim 1, wherein said bridges include elastic members that are elastically deformable along said arranged direction.

3. The keyboard device of claim 2, wherein said elastic members are leaf spring type members connecting said end surfaces of said adjacent plate members.

4. The keyboard device of claim 2, wherein said elastic members are leaf spring type members that are bent to extend over said gaps, connecting said end surfaces of said adjacent plate members.

5. The keyboard device of claim 1, wherein said gaps have a zigzag shape that bends in a longer direction of said baseplate and in a shorter direction that is orthogonal to said longer direction.

6. The keyboard device of claim 5, wherein said gaps are provided at positions where said gaps overlap a bottom of a frame section of said frame.

7. A keyboard device comprising:

a baseplate formed by a plurality of plate members, wherein adjacent two of said plate members are connected by a plurality of bridges located in a gap provided between end surfaces of said adjacent plate members that oppose each other, and said adjacent plate members are relatively movable through said bridges in a longitudinal direction that said plate members are arranged, wherein said bridges further include slide members that slid in a predetermined sliding range along at least said arranged direction;

a plurality of keytops supported in a vertically movable manner on an upper surface side of said baseplate;

a frame mounted on said upper surface side of said baseplate, wherein said frame includes a plurality of openings in which said keytops are inserted in a vertically movable manner;

a membrane sheet, which detects depressing operations when said keytops are being depressed, is provided on said upper surface side of said baseplate, and a backlight sheet, which radiates light to said keytops, is provided on a lower surface side of said baseplate, wherein said backlight sheet includes relief holes at portions corresponding to said slide members.

8. The keyboard device of claim 7, wherein said relief holes extend along said lateral direction of said frame so as to be provided at positions overlapping said bottom of horizontal frame portions that partition said keytops in said longitudinal direction.

9. The keyboard device of claim 1, wherein said keyboard device further includes a membrane sheet, which detects depressing operations when said keytops are being depressed, is provided on said upper surface side of said baseplate;

a sheet-like member provided on a lower surface side of said baseplate; and at least a part of said outer peripheral edge of said sheet-like member is provided with a bent portion, which is bent to wrap therein an outer peripheral end surface of said baseplate and an end of which is fixed to said upper surface of said membrane sheet.

10. The keyboard device of claim 9, wherein said sheet-like member is a backlight sheet, which radiates light to said keytops, said backlight sheet is composed of a masking sheet that restricts said irradiation range of light, a light guide plate that guides light to an irradiation direction, and a reflection sheet that reflects light upward, said masking sheet, said light guide plate, and said reflection sheet being deposited in this order from said lower surface side of said baseplate, and said bent portion is provided on said reflection sheet.

11. The keyboard device of claim 9, wherein said sheet-like member is provided with a plurality of openings, and at least some of said plurality of openings are closed by electrically conductive sheets that are in contact with said lower surface of said baseplate.

12. The keyboard device of claim 11, wherein said sheet-like member is arranged such that said electrically conductive sheet is in contact with said lower surface of at least one of said plate members located on both ends in said arranged direction, and said peripheral edges of openings that are not closed by said electrically conductive sheet are fixed to said lower surface of said other of said plate members located on both ends or said lower surface of at least one of said plate members sandwiched between said plate members located on both ends, thus exposing said lower surface of said plate member through said openings that have said peripheral edges thereof fixed to said lower surface of said plate member.

13. An electronic apparatus comprising:

a main body chassis;

a display chassis connected to said main body chassis in an openable and closable manner; wherein said display chassis includes a display; and a keyboard device provided within said main body chassis, wherein said keyboard device includes a baseplate formed by a plurality of plate members, wherein adjacent two of said plate members are connected by a plurality of bridges located in a gap provided between end surfaces of said adjacent plate members that oppose each other, and said adjacent plate members are relatively movable through said bridges in a longitudinal direction that said plate members are arranged, wherein said bridges include slide members that slid in a predetermined sliding range along at least said arranged direction, wherein one of said slide members includes a first engagement section extending from one of said adjacent plate members to another one of said adjacent plate members, and a second engagement section extending from said another one of said adjacent plate members to said one of said adjacent plate members and is slidably engaged with said first engagement section;

a plurality of keytops supported in a vertically movable manner on an upper surface side of said baseplate; and a frame mounted on said upper surface side of said baseplate, wherein said frame includes a plurality of openings in which said keytops are inserted in a vertically movable manner.

14. The electronic apparatus of claim 13, wherein said bridges include elastic members that are elastically deformable along said arranged direction, wherein said elastic members are leaf spring type members connecting said end surfaces of said adjacent plate members.

15. The electronic apparatus of claim 13, wherein said plurality of plate members is three plate members.

16. The keyboard device of claim 1, wherein said plurality of plate members is three plate members.

* * * * *